(12) United States Patent
Chaudhury et al.

(10) Patent No.: US 10,178,396 B2
(45) Date of Patent: *Jan. 8, 2019

(54) OBJECT TRACKING

(75) Inventors: Santanu Chaudhury, New Delhi (IN); Subarna Tripathi, Bangalore (IN); Sumantra Dutta Roy, New Dehli (IN)

(73) Assignee: STMICROELECTRONICS INTERNATIONAL N.V., Amsterdam (NL)

( * ) Notice: Subject to any disclaimer, the term of this patent is extended or adjusted under 35 U.S.C. 154(b) by 764 days.

This patent is subject to a terminal disclaimer.

(21) Appl. No.: 13/341,697

(22) Filed: Dec. 30, 2011

(65) Prior Publication Data

US 2012/0170659 A1    Jul. 5, 2012

Related U.S. Application Data

(63) Continuation-in-part of application No. 12/554,579, filed on Sep. 4, 2009, now Pat. No. 8,848,802.

(51) Int. Cl.
*H04N 7/12* (2006.01)
*H04N 19/36* (2014.01)
(Continued)

(52) U.S. Cl.
CPC ............. *H04N 19/36* (2014.11); *G06T 7/194* (2017.01); *G06T 7/215* (2017.01); *H04N 19/12* (2014.11);
(Continued)

(58) Field of Classification Search
CPC ............ G06T 7/2006; H04N 19/00545; H04N 19/00448; H04N 19/36; H04N 19/139
(Continued)

(56) References Cited

U.S. PATENT DOCUMENTS 5,057,940 A    10/1991    Murakami et al.
5,748,761 A *   5/1998    Chang et al. ................. 382/107
(Continued)

OTHER PUBLICATIONS

ISO/IEC International Standard, "Information technology—Coding of audio-visual objects—Part 2: Visual," ISO/IEC 14496-2, Second edition, Dec. 1, 2001, 536 pages.
(Continued)

*Primary Examiner* — Y Lee
*Assistant Examiner* — Richard B Carter
(74) *Attorney, Agent, or Firm* — Seed IP Law Group LLP

(57) ABSTRACT

A video compression framework based on parametric object and background compression is proposed. At the encoder, an object is detected and frames are segmented into regions corresponding to the foreground object and the background. The encoder generates object motion and appearance parameters. The motion or warping parameters may include at least two parameters for object translation; two parameters for object scaling in two primary axes and one object orientation parameter indicating a rotation of the object. Particle filtering may be employed to generate the object motion parameters. The proposed methodology is the formalization of the concept and usability for perceptual quality scalability layer for Region(s) of Interest. A coded video sequence format is proposed which aims at "network friendly" video representation supporting appearance and generalized motion of object(s).

19 Claims, 35 Drawing Sheets
(22 of 35 Drawing Sheet(s) Filed in Color)

(51) Int. Cl.

| | |
|---|---|
| *H04N 19/139* | (2014.01) |
| *H04N 19/159* | (2014.01) |
| *H04N 19/70* | (2014.01) |
| *H04N 19/46* | (2014.01) |
| *H04N 19/61* | (2014.01) |
| *H04N 19/12* | (2014.01) |
| *H04N 19/132* | (2014.01) |
| *H04N 19/14* | (2014.01) |
| *H04N 19/154* | (2014.01) |
| *H04N 19/17* | (2014.01) |
| *H04N 19/82* | (2014.01) |
| *H04N 19/20* | (2014.01) |
| *H04N 19/436* | (2014.01) |
| *H04N 19/527* | (2014.01) |
| *H04N 19/543* | (2014.01) |
| *G06T 7/215* | (2017.01) |
| *G06T 7/194* | (2017.01) |

(52) U.S. Cl.
CPC ......... *H04N 19/132* (2014.11); *H04N 19/139* (2014.11); *H04N 19/14* (2014.11); *H04N 19/154* (2014.11); *H04N 19/159* (2014.11); *H04N 19/17* (2014.11); *H04N 19/20* (2014.11); *H04N 19/436* (2014.11); *H04N 19/46* (2014.11); *H04N 19/527* (2014.11); *H04N 19/543* (2014.11); *H04N 19/61* (2014.11); *H04N 19/70* (2014.11); *H04N 19/82* (2014.11); *G06T 2207/10016* (2013.01); *G06T 2207/20021* (2013.01)

(58) Field of Classification Search
USPC ..... 375/240.16; 382/103, 107, 190; 348/168
See application file for complete search history.

(56) References Cited

U.S. PATENT DOCUMENTS

| | | | | |
|---|---|---|---|---|
| 5,748,775 | A * | 5/1998 | Tsuchikawa et al. ......... | 382/190 |
| 5,754,680 | A | 5/1998 | Sato et al. | |
| 5,901,252 | A | 5/1999 | Kawakami et al. | |
| 6,304,295 | B1 | 10/2001 | Krishnamurthy et al. | |
| 6,404,901 | B1 | 6/2002 | Itokawa | |
| 6,650,705 | B1 | 11/2003 | Vetro et al. | |
| 6,954,544 | B2 | 10/2005 | Jepson et al. | |
| 7,835,542 | B2 * | 11/2010 | Lin ........................... | G06K 9/32 |
| | | | | 382/103 |
| 8,264,544 | B1 * | 9/2012 | Chang et al. ................ | 348/169 |
| 8,848,802 | B2 | 9/2014 | Chaudhury et al. | |
| 2001/0019631 | A1 | 9/2001 | Ohsawa et al. | |
| 2001/0040924 | A1 * | 11/2001 | Hori ........................ | G06T 7/246 |
| | | | | 375/240.16 |
| 2003/0081836 | A1 | 5/2003 | Averbuch et al. | |
| 2003/0086492 | A1 | 5/2003 | Hori et al. | |
| 2003/0117585 | A1 | 6/2003 | Lee | |
| 2005/0286764 | A1 | 12/2005 | Mittal et al. | |
| 2006/0222076 | A1 | 10/2006 | Ludvig et al. | |
| 2007/0041639 | A1 | 2/2007 | Von Berg et al. | |
| 2007/0098221 | A1 | 5/2007 | Florin et al. | |
| 2008/0123747 | A1 * | 5/2008 | Lee ........................ | H04N 19/20 |
| | | | | 375/240.16 |
| 2008/0240499 | A1 * | 10/2008 | Porikli ..................... | G06K 9/32 |
| | | | | 382/103 |
| 2009/0196342 | A1 | 8/2009 | Divorra Escoda et al. | |
| 2009/0310823 | A1 | 12/2009 | Cherng et al. | |
| 2009/0327386 | A1 | 12/2009 | Schoenblum | |
| 2012/0177121 | A1 * | 7/2012 | Tripathi et al. ........... | 375/240.16 |
| 2013/0231940 | A1 | 9/2013 | Ehara | |

OTHER PUBLICATIONS

International Telecommunication Union, "Annex G of the H.264 standard—Series H: Audiovisual and Multimedia Systems; Infrastructure of audiovisual services—Coding of moving video; Advanced video coding for generic audiovisual services," ITU-T Telecommunication Standardization Sector of ITU, Recommendation ITU-T H.264, Mar. 2010, 214 pages.

International Telecommunication Union, "Series H: Audiovisual and Multimedia Systems; Infrastructure of audiovisual services—Coding of moving video; Advanced video coding for generic audiovisual services," ITU-T Telecommunication Standardization Sector of ITU, Recommendation ITU-T H.264, Mar. 2009, 670 pages.

Interra Systems, VEGA H.264 Buffer Analyzer, Version 6.8.1, URL= www.interrasystems.com, 2 pages.

Agarwal et al., "An Innovative Approach for Adaptation of Generic Rate Control Algorithms for Target Video Standards," *2007 IEEE International Conference on Signal Processing and Communications*, Dubai, United Arab Emirates, Nov. 24-27, 2007, 4 pages.

Black et al., "EigenTracking: Robust Matching and Tracking of Articulated Objects Using a View-Based Representation," *International Journal of Computer Vision* 26(1):63-84, 1998.

Black et al., "A framework for Modeling Appearance Change in Image Sequences," *Proc. Sixth International Conference on Computer Vision*, Jan. 4-7, 1998, pp. 660-667.

Boliek et al. (eds.), ISO/IEC JTC 1/SC 29/WG 1 (ITU-T SG8) Coding of Still Pictures, "JPEG 2000 Part I Final Committee Draft Version 1.0," N1646R, Mar. 16, 2000, 205 pages.

Boliek et al. (eds.), ISO/IEC JTC 1/SC 29/WG 1 (ITU_T SG8) Coding of Still Pictures, "JPEG 2000 Part II Final Committee Draft," N2000, Dec. 7, 2000, 351 pages.

Chaudhury et al., "Parametric Video Compression using Appearance Space," *19th International Conference on Pattern recognition*, Dec. 8-11, 2008, 4 pages.

Chaudhury et al., "System and Method for Object Based Parametric Video Coding," U.S. Appl. No. 12/554,579, filed Sep. 4, 2009, 53 pages.

Gupta et al., "On Line Predictive Appearance-Based Tracking," *2004 International Conference on Image Processing*, 2004, 4 pages.

Hakeem et al., "An Object-based Video Coding Framework for Video Sequences Obtained From Static Cameras," *Proceedings of the 13th Annual ACM International Conference on Multimedia*, Singapore, Nov. 6-11, 2005, 5 pages.

Ho et al., "Visual Tracking Using Learned Linear Subspaces," *Proceedings of the 2004 IEEE Computer Society Conference on Computer Vision and Pattern Recognition*, 2004, 8 pages.

Isard et al., "Condensation—Conditional Density Propagation for Visual Tracking," *International Journal of Computer Vision* 29(1):5-28, 1998.

Jepson et al., "Robust Online Appearance Models for Visual Tracking," *IEEE Transactions on Pattern Analysis and Machine Intelligence* 25(10):1296-1311, Oct. 2003.

Khan et al., "A Rao-Blackwellized Particle Filter for EignTracking," *Proceedings of the 2004 IEEE Computer Society Conference on Computer Vision and Pattern Recognition* 2:II-980-II-986, Jun. 27-Jul. 2, 2004.

Khandelia et al., "Parametric Video Compression Scheme using AR based Texture Synthesis," *Sixth Indian Conference on Computer Vision, Graphics & Image Processing*, Bhubaneswar, India, Dec. 16-19, 2008.

Lim et al., "Incremental Learning for Visual Tracking," *Proc. NIPS '05*, 2005. pp. 793-800.

Lin et al., "Adaptive Discriminative Generative Model and Its Applications," *Proc. NIPS '04*, 2004, pp. 801-808.

Ndjiki-Nya et al., "Improved H.264/AVC Coding Using Texture Analysis and Synthesis," *Proceedings of the International Conference on Image Processing*, Sep. 14-17, 2003 3:III-849-52 vol. 2, 2003, 4 pages.

Patwardhan et al., "Hand Gesture Modeling and Recognition involving Changing Shapes and Trajectories, using a Predictive EigenTracker," Apr. 9, 2006, 10 pages.

Ross et al., "Adaptive Probabilistic Visual Tracking with Incremental Subspace Update," *Proc. ECCV '04*, 2004, pp. 470-482.

(56) References Cited

OTHER PUBLICATIONS

Roth et al., "Survey of Appearance-Based Methods for Object Recognition," Technical Report, ICG-TR-01/08, Graz, Jan. 15, 2008, 68 pages.
Skočaj et al., "Weighted and Robust Incremental Method for Subspace Learning," *Proceedings of the Ninth IEEE International Conference on Computer Vision*, Oct. 13-16, 2003, 8 pages.
Sühring, "H.264/AVC Software Coordination," H.264/AVC Joint Model, Version 13.2, retrieved on Mar. 3, 2010, from http://iphome.hhi.de/suehring/tml/, 1 page.
Szummer, "Temporal Texture Modeling," Master's Thesis, Massachusetts Institute of Technology, Sep. 1995, 57 pages.
Szummer et al., "Temporal Texture Modeling," *Proceedings of the International Conference on Image Processing*, Sep. 16-19, 1996, 3:823-826, 1996.
Tripathi et al., "Advance Video Coding With Perceptual Quality Scalability for Regions of Interest," U.S. Appl. No. 13/341,687, filed Dec. 20, 2011, 112 pages.
Tripathi et al., "Online Improved Eigen Tracking," *Proceedings of the International Conference on Advances in Pattern Recognition*, 2009, 4 pages.
Van Leuven et al., "An Implementation of Multiple Region-of-Interest Models in H.264/AVC," SITIS, 2006, 10 pages.
Weng et al., "Candid Covariance-Free Incremental Principle Component Analysis," *IEEE Transactions on Pattern Analysis and Machine Intelligence* 25(8):1034-1040, 2003.
Zhang et al., "Convergence Analysis of Complementary Candid Incremental Principle Component Analysis," Technical Report of Computer Science Department at Michigan State University, Aug. 2001, 7 pages.
Zheng et al., "H.264 ROI Coding Based on Visual Perception," The Institute of Engineering and Technology, VIE 08, 2008, 6 pages.
Zhu et al., "Video Coding with Spatio-Temporal Texture Synthesis and Edge-Based Inpainting," *2008 IEEE International Conference on Multimedia and Expo*, Hannover, Germany, Jun. 23-Apr. 26, 2008, pp. 813-816.
Zhu et al., "Video Coding with Spatio-Temporal Texture Synthesis", 2007, IEEE, pp. 112-115.
Doucet et al. (eds.), *Sequential Monte Carlo Methods in Practice*, Springer-Verlag, New York, USA, 2001, 610 pages.

\* cited by examiner

| SPS | PPS | Slice IDR #0 | ROI NAL #0,*0 | ROI NAL #0,*1 | ... | ROI NAL #0,*N | BCK #1 | ROI NAL #1,*0 | ROI NAL #1,*1 | ... | ROI NAL #1,*N | BCK #2 | ROI NAL #2,*0 | ROI NAL #2,*1 | ... | ROI NAL #2,*N |

Fig. 14

OBJECT TRACKING

BACKGROUND

Technical Field

The present disclosure relates to video encoder and decoder systems and related methods, including video compression systems and methods.

Description of the Related Art

Video compression is commonly achieved by identifying and removing redundancies, such as redundancies in the frequency, spatial, temporal and entropy domains. Standard coding techniques, such as predictive coding, transform coding and vector quantization, treat the image/video as random signals and exploit their stochastic properties to achieve compression. Such video compression schemes utilize prediction, motion compensation and transform-based approaches to remove inter-pixel redundancy. These schemes, however, do not efficiently take into account the perceptual redundancy present in background texture areas and regions of interest (ROI).

BRIEF SUMMARY

This disclosure is generally directed to a network-friendly coded video sequence format framework supporting appearance and generalized motion of one or more object(s) or region(s) of interest ROI.

An embodiment employs a framework for integrating object and background coding to achieve higher compression as compared to current standards.

The disclosure includes embodiments of encoders and decoders of an object-based parametric compression method. In an embodiment, an encoder detects objects and segments frames into regions corresponding to the foreground object and the background. The object and the background are individually encoded using separate parametric coding techniques. While the object is encoded using the projection coefficients to the orthonormal basis of the learnt subspace (used for appearance based object tracking), the background is characterized using an auto-regressive (AR) process model. An advantage of an embodiment is that a decoder structure allows for simultaneous reconstruction of object and background, thus making it amenable to multithread/multi-processor architectures.

An embodiment may exploit the perceptual redundancy across frames in the appearance of objects and textures present to attain higher compression rates. The background in many videos includes one or more texture regions which can be efficiently compressed by using schemes for parametric texture representation. Besides this significant compression gains can be achieved by choosing appearance based object coding. Another significant advantage of object-based video coding is that embodiments may be configured to assign different priorities to different objects and the background thus permitting a choice of coding bit-rate based on their significance.

In an embodiment, a digital video encoder comprises: a segmentation module configured to segment frames in a digital video sequence into object regions and background regions; an object parameter generator configured to generate object motion (or sometimes called warping parameters) and appearance parameters based on segmented object regions; and an auto regressive model generator configured to generate an auto regressive background model based on segmented background regions. In an embodiment, the encoder further comprises an encoding module configured compress background I frames, wherein the segmentation module is configured to provide background I frames to the encoding module. In an embodiment, the encoder further comprises a block categorizer configured to categorize blocks in background P frames regions into edge blocks and non-edge blocks, wherein the configured to compress the edge blocks and the auto regressive model generator is configured to generate the auto regressive background model based on non-edge blocks of the segmented background regions. In an embodiment, the encoder further comprises a motion threader configured to generate motion thread information based on non-edge blocks of the segmented background region, wherein the auto regressive model generator is configured to generate the auto regressive background model based on the motion thread information. In an embodiment, the encoder further comprises a block removal module configured to remove the background blocks based on an error criteria. In an embodiment, the block categorizer comprises a gradient-based edge detector. In an embodiment, the object parameter generator comprises an object tracking module, a residual calculator and an H.264 I slice encoder and the object tracking module is configured to generate the object motion and appearance parameters based on the received object region information and a decoded object received from the residual calculator. In an embodiment, the encoding module comprises an H.264/AVC encoder.

In an embodiment, a method of encoding a video image sequence in a digital video encoder comprises: segmenting frames in the digital video sequence into object regions and background regions; generating object motion/warping and appearance parameters based on segmented object regions; and generating auto regressive model parameters based on segmented background regions. In an embodiment, the method further comprises compressing background I frames using transform-based encoding. In an embodiment, the method further comprises compressing background I frames using H.264/AVC encoding. In an embodiment, the method further comprises categorizing blocks in background P frames into edge blocks and non-edge blocks, wherein the generating the auto regressive background model is based on non-edge blocks of the background P frames. In an embodiment, the method further comprises encoding the edge blocks using H.264/AVC encoding. In an embodiment, the method further comprises generating motion thread information based on non-edge blocks of the background P frames. In an embodiment, the categorizing blocks comprises gradient-based edge detection. In an embodiment, the generating object motion and appearance parameters comprises calculating and compressing object residuals.

In an embodiment, a computer-readable memory medium's contents causes a processor to perform a method of encoding a video image sequence, the method comprising: segmenting frames in the digital video sequence into object regions and background regions; generating object motion and appearance parameters based on segmented object regions; and generating auto regressive model parameters based on segmented background regions.

In an embodiment, a digital video decoder comprises: a decoding block configured to decode background I frames in an encoded video sequence; an object appearance estimator configured to estimate an object appearance based on object appearance parameters in the encoded video sequence; and a texture synthesizer configured to generate background P blocks based on auto regressive coefficients and thread information in the encoded video sequence. In an embodiment, the decoder further comprises: an object correction module configured to modify the estimated object appearance based on object residual information in the encoded video sequence. In an embodiment, the decoder further comprises an object motion compensator configured to compensate for object motion based on object motion parameters in the encoded video sequence. In an embodiment, the decoding block is configured to decode edge blocks of background P-frames and the texture synthesizer is configured to generate background P frames based on the auto regressive coefficients, the thread information and the decoded edge blocks. In an embodiment, the decoder further comprises a demultiplexer configured to split the encoded video sequence into: encoded H.264 information; AR coefficients and thread information; and object appearance and motion parameters and compressed object residue information. In an embodiment, when an error criteria is satisfied, the texture synthesizer is configured to output a previous background P block as a current background P block.

In an embodiment, a method of decoding an encoded digital video sequence comprises: decoding background I frames in the encoded video sequence; estimating an object appearance based on object appearance parameters in the encoded video sequence; and generating background P frames based on auto regressive coefficients and thread information in the encoded video sequence. In an embodiment, the method further comprises: modifying the estimated object appearance based on object residual information in the encoded video sequence. In an embodiment, the method further comprises: compensating for object motion based on object motion parameters in the encoded video sequence. In an embodiment, the method further comprises: H.264/AVC decoding edge blocks of background P-frames, wherein the generating background P frames is based on the auto regressive coefficients, the thread information and the decoded edge blocks. In an embodiment, the method further comprises: demultiplexing the encoded video sequence into: encoded H.264/AVC information; AR coefficients and thread information; and object appearance and motion parameters and compressed object residue information. In an embodiment, when an error criteria is satisfied, generating a background P frame comprises outputting a previous background P block as a current background P block.

In an embodiment, a computer-readable memory medium's contents cause a processor to perform a method of decoding an encoded video image sequence, the method comprising: decoding background I frames in the encoded video sequence; estimating an object appearance based on object appearance parameters in the encoded video sequence; and generating background P frames based on auto regressive coefficients and thread information in the encoded video sequence. In an embodiment, the method further comprises: modifying the estimated object appearance based on object residual information in the encoded video sequence. In an embodiment, the method further comprises: compensating for object motion based on object motion parameters in the encoded video sequence. In an embodiment, the method further comprises: H.264/AVC decoding edge blocks of background P-frames, wherein the generating background P frames is based on the auto regressive coefficients, the thread information and the decoded edge blocks and the I frame. In an embodiment, the method further comprises: demultiplexing the encoded video sequence into: encoded H.264/AVC information; AR coefficients and thread information; and object appearance and motion parameters and compressed object residue information. In an embodiment, the method further comprises: when an error criteria is satisfied, outputting a previous background P block as a current background P block.

In an embodiment, a system comprises: means for decoding background I frames in an encoded video sequence; means for estimating an object appearance based on object appearance parameters in the encoded video sequence; and means for generating background P frames based on auto regressive coefficients and thread information in the encoded video sequence. In an embodiment, the system further comprises: means for modifying the estimated object appearance based on object residual information in the encoded video sequence. In an embodiment, the system further comprises: means for compensating for object motion based on object motion parameters in the encoded video sequence. In an embodiment, the means for decoding background I frames comprises an H.264 I slice decoder configured to decode background I frames and an H.264 P slice decoder configured to decode edge blocks of background P-frames and the means for generating background P frames is configured to generate background P frames based on the auto regressive coefficients, the thread information and the decoded edge blocks. In an embodiment, the system further comprises: means for splitting the encoded video sequence into: encoded H.264/AVC information; AR coefficients and thread information; and object appearance and motion parameters and compressed object residue information. In an embodiment, the means for generating background P frames is configured to, when an error criteria is satisfied, output a previous background P block as a current background P block. In an embodiment, the system further comprises: a digital video encoder, including: means for segmenting frames in a digital video sequence into object regions and background regions; means for generating object motion and appearance parameters based on segmented object regions; and means for generating an auto regressive background model based on segmented background regions.

In an embodiment, a digital video encoder comprises: a segmentation module configured to segment frames in a digital video sequence into background regions and object regions; and an object parameter generator configured to generate object motion and object appearance parameters based on segmented object regions, the motion parameters defining a location of an object and including at least one motion parameter defining an orientation of a segmented object region. In an embodiment, the object regions comprise oriented rectangles. In an embodiment, the encoder further comprises: an encoding module configured to encode an indication of prioritization of an object. In an embodiment, the encoding module is configured to encode the indication of prioritization as a perceptual quality scalability of a scalable video coding bit stream. In an embodiment, the encoding module is configured to encode the indication of prioritization in a network abstraction layer unit of a video compression standard. In an embodiment, the video compression standard is an H.264/SVC standard and the network abstraction layer unit is unit 20 of the H.264/SVC standard. In an embodiment, the encoder further comprises an encoding module configured to encode the object motion and appearance parameters of a frame into a raw byte sequence payload. In an embodiment, the motion parameters include restricted affine motion parameters. In an embodiment, the motion parameters include general motion parameters. In an embodiment, the encoding module is configured to multiplex object and background data in the raw byte sequence payload. In an embodiment, a format of the raw byte sequence data is specified in a network abstraction layer format unit. In an embodiment, the encoder further comprises: an auto regressive model generator configured to generate an auto regressive background model based on segmented background regions; an encoding module configured to compress background I frames, wherein the segmentation module is configured to provide background I frames to the encoding module; and a block categorizer configured to categorize blocks in background P frames regions into edge blocks and non-edge blocks, wherein the encoding module is further configured to compress the edge blocks and the auto regressive model generator is configured to generate the auto regressive background model based on non-edge blocks of the segmented background regions. In an embodiment, the object parameter generator comprises an object tracking module. In an embodiment, the object parameter generator comprises a residual calculator and an H.264 I slice encoder and the object tracking module is configured to generate the object motion and appearance parameters based on the received object region information and a decoded object received from the residual calculator. In an embodiment, the encoder further comprises an H.264/AVC (Advanced Video Coding) compatible encoding module. In an embodiment, the encoding module is configured to employ a raw byte sequence payload in a network abstraction layer unit to specify a bit stream structure. In an embodiment, the network abstraction layer unit is a code slice extension unit.

In an embodiment, a method comprises: segmenting frames in a digital video sequence into background regions and object regions; generating object motion parameters of a segmented object region, the object motion parameters including at least two motion parameters defining a location of a segmented object region inside the video frame, including at least one motion parameter indicating an orientation of the segmented object region; generating object appearance parameters of the segmented object region; and encoding the object motion parameters and the object appearance parameters in a bit stream. In an embodiment, the object regions comprise oriented rectangles and the at least one motion parameter comprises a translation parameter, a scaling parameter and a parameter indicating a difference of an orientation angle between a width axis of the object region and an axis of a bounding box for successive frames in the digital video sequence. In an embodiment, the method further comprises: encoding an indication of prioritization of the segmented object region in the bit stream. In an embodiment, encoding the indication of prioritization comprises encoding the indication of prioritization as a perceptual quality scalability of a scalable video coding bit stream. In an embodiment, encoding the indication of prioritization comprises encoding the indication of prioritization in a reserved field of network abstraction layer unit of video compression standard. In an embodiment, the video compression standard is an H.264/SVC standard and the network abstraction layer unit is unit 20 of the H.264/SVC standard. In an embodiment, encoding the object motion parameters and the object appearance parameters in a bit stream comprises encoding the object motion parameters and the object appearance parameters of a frame into a raw byte sequence payload. In an embodiment, encoding the object motion parameters and the object appearance parameters in the bit stream comprises multiplexing object and background data in the bit stream.

In an embodiment, a non-transitory computer-readable medium's contents cause an encoder to perform a method of encoding a video image sequence, the method comprising: segmenting frames in a digital video sequence into background regions and object regions; generating object motion parameters of a segmented object region, the object motion parameters including at least one motion parameter defining an orientation of the segmented object region; generating object appearance parameters of the segmented object region; and encoding the object motion parameters and the object appearance parameters in a bit stream. In an embodiment, the object regions comprise oriented rectangles. In an embodiment, the method further comprises encoding an indication of prioritization of the segmented object region in the bit stream. In an embodiment, encoding the object motion parameters and the object appearance parameters in the bit stream comprises multiplexing object and background data in the bit stream.

In an embodiment, a digital video decoder comprises: a decoding block configured to decode background I frames in an encoded video sequence; an object appearance estimator configured to estimate an object appearance based on object appearance parameters in the encoded video sequence; and an object motion compensator configured to compensate for object motion based on object motion parameters in the encoded video sequence, the object motion parameters including at least one motion parameter defining an orientation of a segmented object region. In an embodiment, the decoder further comprises: an object correction module configured to modify the estimated object appearance based on object residual information in the encoded video sequence. In an embodiment, the object motion parameters include general motion parameters. In an embodiment, the decoder further comprises: a demultiplexer configured to split the encoded video sequence into: encoded H.264 information; AR coefficients and thread information; and object appearance and motion parameters and compressed object residue information. In an embodiment, object regions comprise oriented rectangles. In an embodiment, the decoder is configured to extract an indication of prioritization of an object from the encoded video sequence.

In an embodiment, a method comprises: decoding background I frames in an encoded video sequence; estimating an object appearance based on object appearance parameters in the encoded video sequence; and compensation for object motion based on object motion parameters in the encoded video sequence, the object motion parameters including at least one motion parameter defining an orientation of a segmented object region. In an embodiment, the method further comprises: demultiplexing the encoded video sequence into: encoded H.264/AVC information; AR coefficients and thread information; and object appearance and motion parameters and compressed object residue information.

In an embodiment, a system comprises: means for segmenting frames in a digital video sequence into background regions and object regions; means for generating object motion parameters of a segmented object region, the object motion parameters including at least one parameter defining an object orientation; means for generating object appearance parameters of the segmented object region; and means for encoding the object motion parameters and the object appearance parameters in a bit stream. In an embodiment, the system further comprises: means for multiplexing object and background data in the bit stream. In an embodiment, the system further comprises: means for decoding background I frames in an encoded video sequence; and means for estimating an object appearance based on object appearance parameters in the encoded video sequence.

In an embodiment, a digital video encoder comprises: a segmentation module configured to segment frames in a digital video sequence into background regions and object regions; and an object parameter generator configured to generate object motion and object appearance parameters based on segmented object regions, the object parameter generator including a tracking module configured to: identify motion parameter states based on particle filtering; and track one or more object regions based on one or more motion parameter states selected from the identified motion parameter states. In an embodiment, the object regions comprise oriented rectangles. In an embodiment, the particle filtering includes importance sampling. In an embodiment, the importance sampling is based on a normalized color histogram. In an embodiment, the tracking module is configured to estimate a target state by selecting one of the identified motion parameter states. In an embodiment, the tracking module is configured to select a motion parameter state from the identified motion parameter states that is a minimum distance from a learnt subspace. In an embodiment, the tracking module is configured to select a motion parameter state having a minimum reconstruction error with respect to a learnt subspace. In an embodiment, the tracking module is configured to: determine a similarity of a normalized color histogram for a region associated with the estimated target state and an initial color histogram for a region associated with an object; compare the similarity to a first similarity threshold; when the similarity exceeds the first similarity threshold, set a target state for the region associated with the object to the estimated target state; and when the similarity does not exceed the first similarity threshold, selectively, identify new motion parameter states; and estimate a new target state by selecting one of the identified new motion parameter states. In an embodiment, the tracking module is configured to, when the similarity does not exceed the first similarity threshold and a number of iterations of identifying new motion parameter states exceeds an iteration threshold: determine whether the object is visible based on a comparison of the similarity to a second similarity threshold and a comparison of a reconstruction error associated with the estimated target state to a reconstruction error threshold; and when it is determined that the object is visible, setting the target state for the region associated with the object to an identified state having a lowest reconstruction error. In an embodiment, the tracking module is configured to determine whether an object is occluded in a frame. In an embodiment, the encoder further comprises: an auto regressive model generator configured to generate an auto regressive background model based on segmented background regions.

In an embodiment, a method comprises: segmenting frames in a digital video sequence into background regions and object regions; generating object motion parameters of a segmented object region based on particle filtering; generating object appearance parameters of the segmented object region; and encoding the object motion parameters and the object appearance parameters in a bit stream. In an embodiment, the generating object motion parameters comprises: identifying motion parameter states based on the particle filtering; and tracking the segmented object region based on one or more motion parameter states selected from the identified motion parameter states. In an embodiment, the object regions comprise oriented rectangles and the object motion parameters comprise a translation parameter, a scaling parameter and a parameter indicating a difference of an orientation angle between a width axis of the object region and an axis of a bounding box for successive frames in the digital video sequence. In an embodiment, the particle filtering includes importance sampling. In an embodiment, the importance sampling is based on a normalized color histogram. In an embodiment, the generating object motion parameters comprises selecting one of the identified motion parameter states as an estimated target state. In an embodiment, the estimated target state is one of the identified sample motion parameter states that is a minimum distance from a learnt subspace. In an embodiment, the selecting one of the motion parameter states comprises determining a reconstruction error. In an embodiment, the method comprises: determining a similarity of a normalized color histogram for a region associated with the estimated target state and an initial color histogram for the segmented object region; comparing the similarity to a first similarity threshold; when the similarity exceeds the first similarity threshold, setting a target state for the region associated with the object to the estimated target state; and when the similarity does not exceed the first similarity threshold, selectively, identifying new motion parameter states; and estimating a new target state by selecting one of the identified new motion parameter states. In an embodiment, when the similarity does not exceed the first similarity threshold and a number of iterations of identifying new motion parameter states exceeds an iteration threshold, the method comprises: determining whether the object is visible based on a comparison of the similarity to a second similarity threshold and a comparison of a reconstruction error associated with the estimated target state to a reconstruction error threshold; and when it is determined that the object is visible, setting the target state for the region associated with the object to an identified state having a lowest reconstruction error.

In an embodiment, a non-transitory computer-readable medium's contents cause an encoder to perform a method of encoding a video image sequence, the method comprising: segmenting frames in a digital video sequence into background regions and object regions; generating object motion parameters of a segmented object region based on particle filtering; generating object appearance parameters of the segmented object region; and encoding the object motion parameters and the object appearance parameters in a bit stream. In an embodiment, the generating object motion parameters comprises: identifying motion parameter states based on the particle filtering; and tracking the segmented object region based on one or more motion parameter states selected from the identified motion parameter states. In an embodiment, the object regions comprise oriented rectangles and the object motion parameters comprise a translation parameter, a scaling parameter and a parameter indicating a difference of an orientation angle between a width axis of the object region and an axis of a bounding box for successive frames in the digital video sequence. In an embodiment, the particle filtering includes importance sampling. In an embodiment, the generating object motion parameters comprises selecting one of the identified motion parameter states as an estimated target state. In an embodiment, the method comprises: determining a similarity of a normalized color histogram for a region associated with the estimated target state and an initial color histogram for the segmented object region; comparing the similarity to a first similarity threshold; when the similarity exceeds the first similarity threshold, setting a target state for the region associated with the object to the estimated target state; and when the similarity does not exceed the first similarity threshold, selectively, identifying new motion parameter states; and estimating a new target state by selecting one of the identified new motion parameter states. In an embodiment, when the similarity does not exceed the first similarity threshold and a number of iterations of identifying new motion parameter states exceeds an iteration threshold, the method comprises: determining whether the object is visible based on a comparison of the similarity to a second similarity threshold and a comparison of a reconstruction error associated with the estimated target state to a reconstruction error threshold; and when it is determined that the object is visible, setting the target state for the region associated with the object to an identified state having a lowest reconstruction error.

In an embodiment, a system comprises: means for segmenting frames in a digital video sequence into background regions and object regions; means for generating object motion parameters of a segmented object region based on particle filtering; means for generating object appearance parameters of the segmented object region; and means for encoding the object motion parameters and the object appearance parameters in a bit stream. In an embodiment, the system further comprises: means for decoding the encoded bit stream. In an embodiment, the system further comprises means for determining whether an object is occluded in a frame.

The foregoing features, and advantages will be discussed in detail in the following non-limiting description of example embodiments in connection with the accompanying drawings.

BRIEF DESCRIPTION OF THE SEVERAL VIEWS OF DRAWINGS

The foregoing and other features, aspects and advantages will become apparent from the following detailed description of embodiments, given by way of illustration and not limitation with reference to the accompanying drawings. The patent or application file contains at least one drawing executed in color. Copies of this patent or patent application publication with color drawings will be provided by the Office upon request and payment of the necessary fee.

FIG. 14 illustrates an embodiment of a raw byte sequence payload (rbsp) of an extended H.264 bit stream.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In this disclosure embodiments of a video compression techniques are proposed that may be configured to exploit both the perceptual redundancy present in a texture (or a slowly changing/static background) and the capabilities of appearance based object coding.

Figure 1:
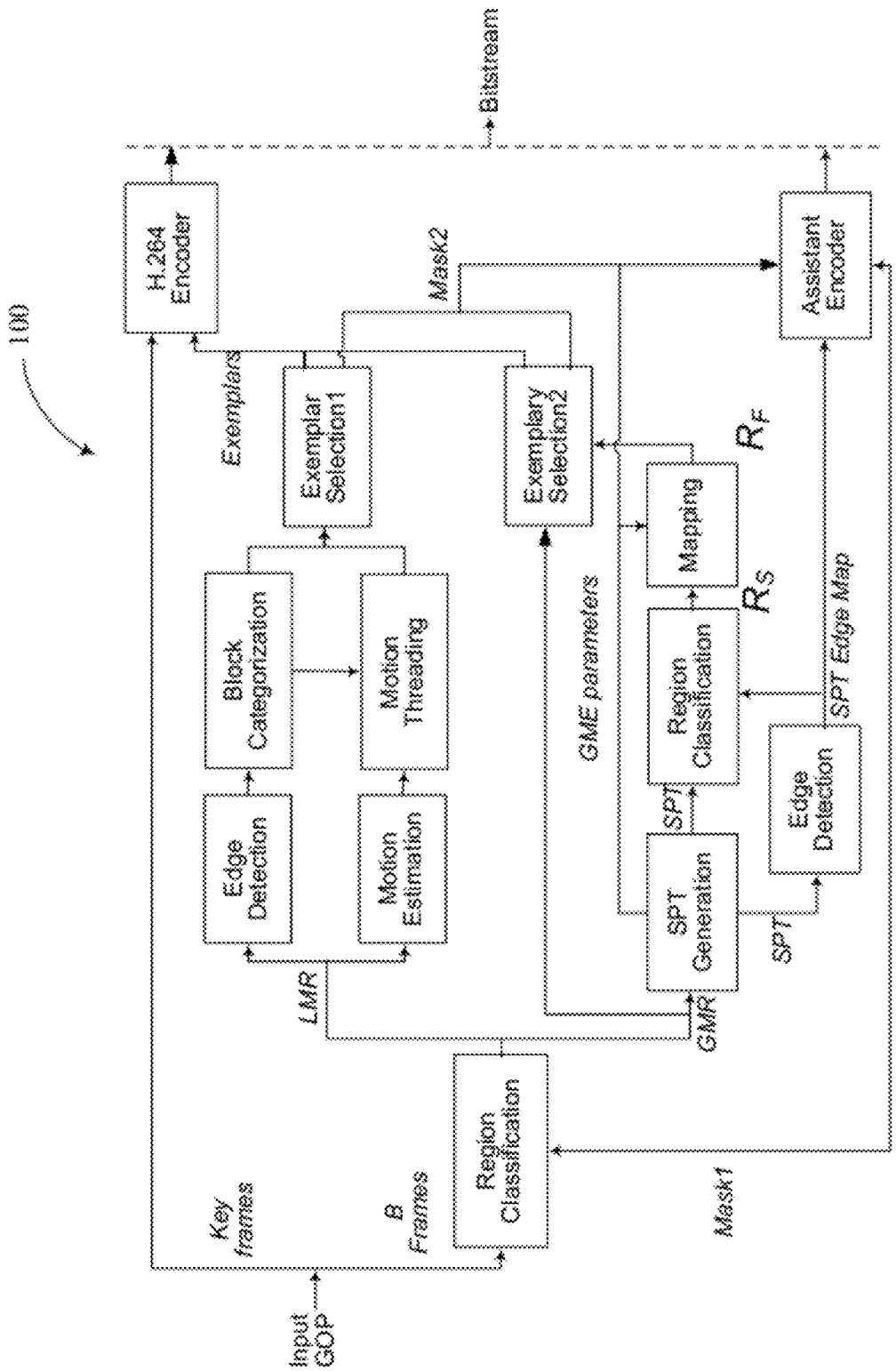
FIG. 1 shows an encoder configured to employ a coding paradigm based on independent characterization of local motion regions (LMR) and global motion regions (GMR).
Figure 2:
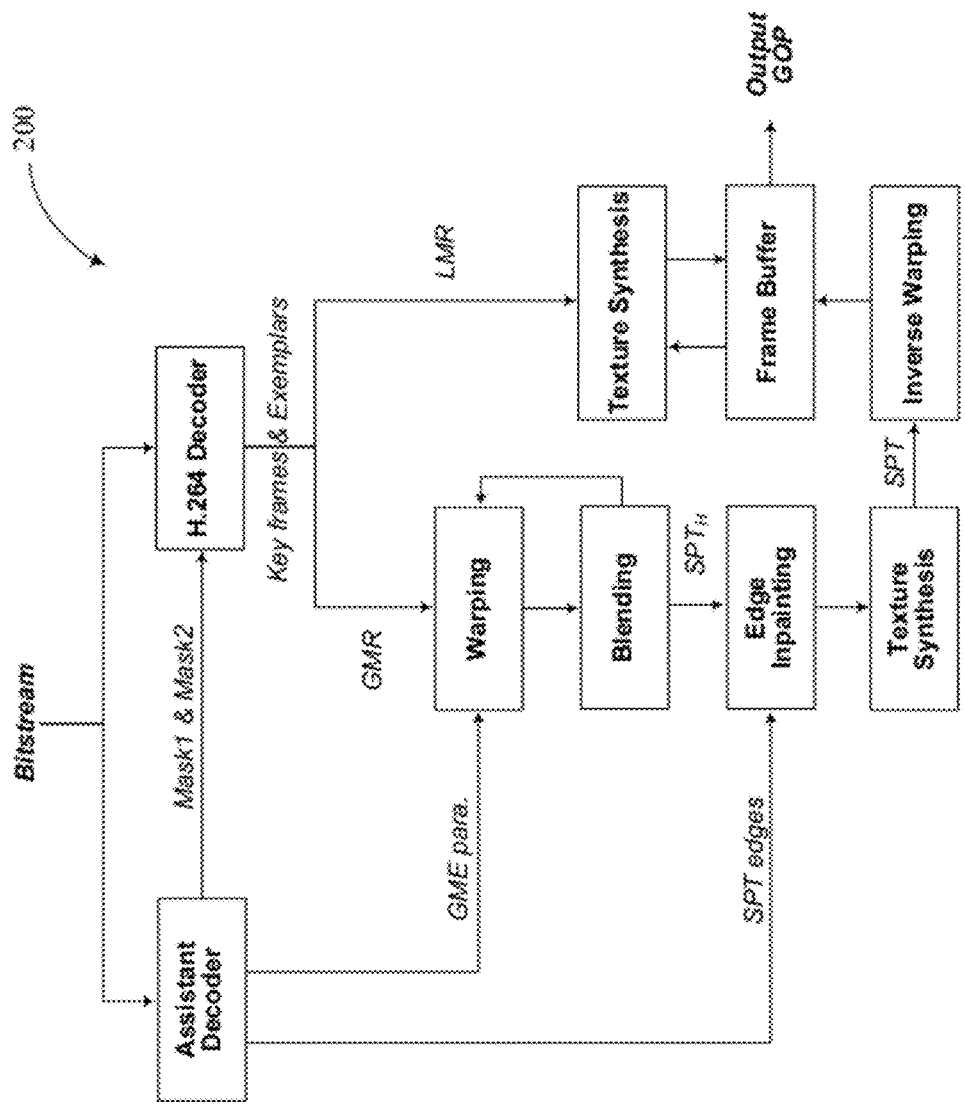
FIG. 2 shows a decoder configured to decode a signal from the encoder of FIG. 1.

Zhu, et al., have proposed a coding paradigm with an encoder architecture based on characterization of local motion regions (LMR) and global motion regions (GMR). See C. Zhu, X. Sun, F. Wu, H. Li, "Video coding with Spatio-temporal texture synthesis and Edge-based inpainting," ICME 2008, pp. 813-816, 2008. Exemplars are chosen from both the LMR and the GMR regions. In LMR region blocks are divided into structural blocks and textural blocks. The structural blocks are exemplars coded with H.264 encoder, and the textural blocks are motion threaded, some of the motion threads are chosen as exemplars and others are removed. Sprite-based generation is used for selecting the exemplars in the GMR. Exemplars are coded/decoded with a usual H.264 encoder/decoder. FIGS. 1 and 2 illustrate an encoder 100 and a decoder 200 configured to employ a coding paradigm based on characterization of local motion regions (LMR) and global motion regions (GMR). While the non-exemplar blocks in the LMR region are reconstructed using an extension of the patch-wise inpainting, GMR blocks are reconstructed using warping and blending and filling 'holes' using inpainting. The scheme is applied to B-frames. In addition, reconstruction in Zhu is based on inpainting, warping and blending, which are computationally intensive operations.

In an embodiment as described herein, all object blocks (in all frames) and most background blocks in the P-frame may be encoded using parametric coding techniques, resulting in potentially higher compression. Instead of reconstruction based on inpainting, warping and blending, model parameter based reconstruction may be employed, which has low computational complexity, and the decoder is hence more amenable to real-time applications. The encoder first segments the frame into moving object and background. These two segments are then independently encoded. The segmentation may be achieved by using a moving object segmentation method based on principle component analysis (PCA).

In an embodiment, the background region of a frame is divided into 16×16, non-overlapping blocks. In some embodiments, different block sizes may be employed. In some embodiments, overlapping blocks may be employed. Each block is then classified as an edge or a non-edge block, for example, by a gradient-based edge detector. To preserve edge information and transitions among different regions, edge blocks may be encoded using, for example, a standard H.264/AVC P slice encoding scheme. The remaining blocks of the background region (called the texture blocks) are then motion threaded and each thread is modeled using a 3-D auto regressive (AR) model. The selected texture regions in a video may be reconstructed from their spatio-temporal neighbors without significant loss of visual quality. The object is encoded using the projection coefficients to the orthonormal basis of the incrementally learnt Eigen subspace (used for appearance-based object tracking).

The system extracts an arbitrary shaped object in the video frames and segments the frames into object and background regions. The moving object may be detected, for example, by analyzing the first three frames in the following manner.

First, an improved principal component analysis technique may be used to adapt the motion detection. The definition of traditional covariance matrix is modified to $$C=(X1-X2)^T(X1-X2)+(X2-X3)^T(X2-X3)+(X1-X3)^T(X1-X3) \quad (1)$$

where, Xi is a one dimensional vector obtained by vectorizing the frame i in the sequence. The calculation result may be improved to obtain a good initialization of the object's bounding box, as discussed in more detail below. After segmentation the object and background regions are fed into different encoding paths as illustrated in FIG. 3, discussed in more detail below.

For each frame, the encoder codes the estimated object by projection coefficients onto the learnt subspace and motion parameters. The coded video stream, at each time instance, contains the compressed object difference image and the motion and appearance parameters in the subspace of the object. The motion parameters may include, for example, one or more positional (warping) parameters, such as parameters indicating whether the object has rotated or has transposed or has changed it size and shape.

For encoding the background, I-frames are coded, for example, using H.264/AVC I slice coder and P-frames are encoded as follows. The background region of each P-frame is divided into blocks, such as non-overlapping 16×16 blocks. Each block is classified as an edge or a non-edge block. For example, a gradient-based edge detector may be used to classify each block as an edge or a non-edge block. To preserve edge information and transitions between object and background regions, edge blocks are encoded by using, for example, a standard H.264/AVC P slice encoder. The remaining blocks (called the texture blocks) are processed further. Block-based motion threading is performed on texture blocks and each of the threads is represented using a spatio-temporal AR model. To account for the cases where the performance of AR model is not satisfactory, residues may be calculated for each block to be synthesized and energy of residues compared to a threshold. If the energy exceeds the threshold that block may be encoded using, for example, H.264. The coded bit stream includes these coefficients and the motion thread information.

Figure 3:
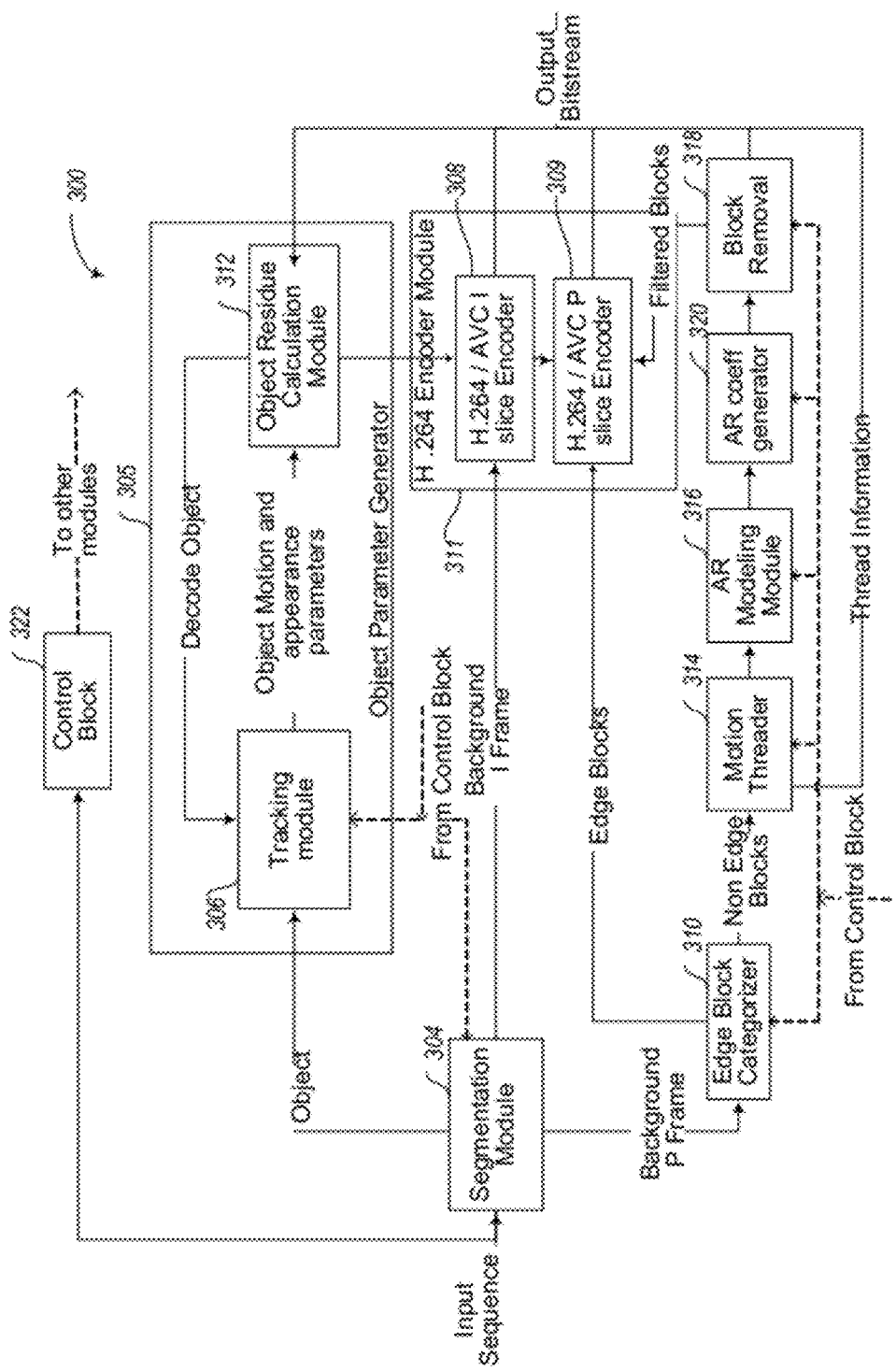
FIG. 3 shows an embodiment of an encoder configured to use parametric encoding for object regions and AR modeling for non-edge blocks of background P frames.

FIG. 3 shows a block diagram of an embodiment of an encoder 300. The encoder has a moving object segmentation module 304 which is configured to receive a input sequence of video frames, extract an arbitrary shaped object in the video frames and segment the frames into object and background regions. The segmentation module 304 is coupled to a tracking module 306, a standard encoding module such as an H.264/AVC I slice encoder 308, and an edge block categorizer 310.

The segmentation module 304 is configured to provide the extracted object region to an object parameter generator 305. As illustrated, the object parameter generator 305 comprises the tracking module 306 and an object residue calculation module 312. The tracking module 306 is configured to generate object motion and appearance parameters and provide the object motion and appearance parameters to the object residue calculation module 312. The object residue calculation module 312 is configured to provide decoded object feedback to the tracking module 306 and object residue data to the H.264/AVC I slice encoder 308. The tracking module 306 is configured to generate the object motion and appearance parameters based on the extracted object region received from the segmentation module and the decoded object received from the object residue calculation module 312. The object residue calculation module 312 is configured to generate object residue data for the H.264 I slice encoder 308 based on the object motion and appearance parameters and the object region. For each frame, the object residue calculation module 312 is configured to code an estimated object by projection coefficients onto a learnt subspace and motion parameters. The coded video stream, at each time instance, contains the compressed object difference image and the motion and appearance parameters in the subspace of the object.

The segmentation module 304 is configured to provide background I frame regions to the H.264 I slice encoder 308 and to provide background P frame regions to the edge block categorizer 310. The edge block categorizer 310 is configured to categorize background blocks of the P frames as edge blocks or non-edge blocks. The edge block categorizer 310 may be configured, for example, to divide the P frames into 16×16 non-overlapping blocks and to classify blocks as edge blocks or non-edge blocks using gradient based edge detection, and may comprise a gradient-based edge detector. For example, to identify edge blocks a gradient may be used as a measure. Blocks may be classified on the basis of edges since highly structured textures and edges (nonstationary information) are not well synthesized using an AR model. Sobel operators may be applied to find the gradient in x and y direction ($G_x$ and $G_y$, respectively). Then the magnitude of gradient at a given pixel G may be found, for example, as:

$$|G|=\sqrt{(G_x^2+G_y^2)} \quad (2)$$

To determine whether a given block is an edge block, the magnitude of the gradient over all the pixels in the block may be summed and compared to a threshold. If the sum is greater than the threshold, the block may be classified as an edge block. If the sum is less than the threshold, the sum may be classified as a non-edge block.

The edge block categorizer 310 is configured to output the edge blocks to a standard encoder such as the illustrated H.264 P slice encoder 309 and to output the non-edge blocks to a motion threader 314. As illustrated, the H.264 I slice encoder 308 and the H.264 P slice encoder 309 are integrated into an H.264 encoder module 311. The motion threader 314 is coupled to an auto-regressive (AR) modeling module 316. The motion threader 314 also is configured to generate thread information which is incorporated into the output bit stream of the encoder 300. The AR modeling module 316 also is coupled to a block removal module 318 and an AR coefficient generator 320. The block removal module 318 is configured to identify blocks in a background P frame that have to be removed (the blocks that are not efficiently modeled using AR modeling). The removed blocks are provided to the standard encoding module 309. The AR coefficient generator 320 is configured to generate AR modeling coefficients for the non-edge blocks of the background P frames. As illustrated, the encoder 300 comprises a control block 322 configured to generate control signals for controlling the various modules of the encoder 300. The control block 322 may comprise, for example, a processor and a memory (see FIG. 8), and the memory may contain instructions that when executed by the processor cause the encoder 300 to encode an input digital video stream.

For encoding the foreground, an embodiment of an encoder, such as the encoder 300 shown in FIG. 3, is configured to track objects that change position and/or appearance. The problem may be viewed as estimating a set of eigenspace reconstruction coefficients and restricted affine deformation coefficients, which minimize the reconstruction error on projecting information from a new frame, onto an eigenspace built incrementally. A particle filter-based prediction for a next position of the object may be employed, leading to an efficient search procedure for the object of interest. Further, the overhead of non-linear optimization may be avoided. A sampling-based optimization procedure may be employed. An efficient incremental eigenspace update mechanism is employed for tracked objects.

After segmenting the object region in the first frame of the image sequences, the object is tracked using an efficient tracker which is initialized in the first frame. For subsequent frames, measurements are obtained (for example, minimum distant prediction from the learnt sub-space is taken as the description of the tracked object). Then an incremental update of the eigen-spaces is done. The motion parameters values for the next frame are predicted. For each frame, the encoder codes the estimated object using the projection coefficients and motion parameters. Eventually the bit stream for the object part is generated and it contains the compressed object difference image (residue) and the motion and appearance parameters in the subspace of the object. To maintain acceptable perceptual quality even for low bitrates, the object residual may be sent over different scales equivalent to sub-bands. A higher scale means more detail.

An appearance-based object tracker can track moving objects undergoing appearance changes powered by dimensionality reduction techniques. The Isard and Blake condensation algorithm (See M. Isard and A. Blake, "Condensation—Conditional Density Propagation for Visual Tracking," Int'l J. Computer Vision, Vol. 28, No. 1, pp. 5-28 (1998)) can represent simultaneously multiple hypothesis. There are several ways an eigen tracker and particle filter can be combined. See Namita Gupta, Pooja Mittal, Kaustubh S. Patwardhan, Sumantra Dutta Roy, Santanu Chaudhury and Subhashis Banerjee, "On Line Predictive Appearance-Based Tracking," Proc. IEEE Int'l Conf. on Image Processing (ICIP 2004), pp 1041-1044; Kaustubh Srikrishna Patwardhan, Sumantra Dutta Roy, "Hand gesture modeling and recognition involving changing shapes and trajectories, using a Predictive EigenTracker," Pattern Recognition Letters, vol. 28, no. 3, pp. 329-334, February 2007. These approaches have the overhead of non-linear optimization. A fast appearance tracker which eliminates non-linear optimizations completely has been proposed. See Jeffrey Ho, Kuang-Chih Lee, Ming-Hsuan Yang, David Kriegman, "Visual Tracking Using Learned Linear Subspaces," Proceedings of the 2004 IEEE Computer Society Conference on Computer Vision and Pattern Recognition (CVPR'04), Vol 1 pp. 782-789. This approach lacks the benefit of predictive framework.

An embodiment of a method for object tracking is described below. The method may be employed, for example, by the embodiment of an encoder such as the encoder 300 of FIG. 3. The capabilities of eigen tracking are enhanced by augmenting it with a condensation-based predictive framework to increase its efficiency and also increasing speed by avoiding non-linear optimization. Thus, an embodiment employs tracker initialization, a prediction framework, an effective subspace update algorithm and avoidance of non-linear optimizations.

The tracking area may be described by a rectangular window parameterized by $$[x_t, y_t, w_t, h_t, \theta_t],$$

and modeled by a 7 dimensional state vector $$X_t = [x_t, x'_t, y_t, y'_t, w_t, h_t, \theta_t], \quad (3)$$

where $(x_t, y_t)$ represents the position of the tracking window, $(w_t, h_t)$ represents the width and height of the tracking window, $(x'_t, y'_t)$ represents the horizontal and vertical component of the velocity and $\theta_t$ represents the 2D rotation angle of the tracking window. These five motion parameters can track the object with its bounding box being an oriented rectangle. An object may be defined by its minimum bounding rectangle. This seed point is used for sampling windows around it. The predictive framework helps generate better seed values for diverse object dynamics. A simple first-order AR process may be employed to represent the state dynamics (t represents time):

$$X_t = A_t X_{t-1} + w_t \quad (4)$$

where $w_t$ is a zero-mean, white, Gaussian random vector. The measurement is the set of five motion parameters obtained from the image, $Z_t$. The observation model has Gaussian peaks around each observation, and constant density otherwise. The values of the five motion parameters are estimated based on their predicted values and the measurements done. These estimated values serve as seeds to the next frame. For every frame, a sampled version of conditional state density $(S_t)$, and corresponding weights $(\Pi_t)$ for conditional probability propagation or condensation are obtained. The state estimate is used to generate the predictions for the next frame. See N. Gupta, et al., "On Line Predictive Appearance-Based Tracking," Proc. IEEE Int'l Conf. on Image Processing (ICIP 2004), pp. 1041-1044, which discusses a predictive Eigen tracker.

An embodiment of a coding solution can detect the most moving object automatically by analyzing the first three frames, i.e. with the overhead of additional two frames buffering at the beginning of the tracking process which is quite acceptable. A moving object segmentation method based on the improved PCA may be employed. This technique works well when the background is still or changing slowly such as grassplot or cloud for the analyzing frames. The principle component analysis is improved to adapt to the motion detection. The definition of traditional covariance matrix is modified to Equation 1, set forth above.

Secondly, the calculation result may be improved in the following way. Say, E1 and E2 as the first two eigenvectors calculated. The element wise product of these two eigenvectors is:

$$E = E1 \times E2. \tag{5}$$

E effectively eliminates the blur of the eigen images of the moving object. And after formation of E, a simple thresholding usually gives a good initialization of the object's rectangular bounding box.

In most tracking problems, the object of interest undergoes changes in appearance over time. An embodiment of an appearance-based object tracker can detect, for example, an object's 2D translation, rotation, zooming and change of aspect ratio.

It is not feasible to learn all possible poses and shapes even for a particular domain of application, off-line. Therefore, the relevant Eigen spaces are learned and updated on the fly. Since a naive $O(mN^3)$ algorithm (for N images having m pixels each) is time-consuming, an optimal incremental principal component analysis of $O(mNk)$ algorithm (for k most significant singular values) may be used. See, Juyang Weng et al., "Candid Covariance-Free Incremental Principal Component Analysis," IEEE Transactions on Pattern Analysis and Machine Intelligence, Vol. 25(8), pp. 1034-1040 (2003).

The IPCA method converges to the true eigenvectors in fewer computations than PCA. See Y. Zhang and J. Weng, "Convergence Analysis of Complementary Candid Incremental Principal Component Analysis," Technical Report MSU-CSE 01-23, Dept. of Computer Science and Eng., Michigan State Univ., East Lansing (August 2001).

In the first frame, the tracker is initialized as discussed above. For subsequent frames, the next step is to obtain the measurements—taking the minimum distant prediction from the learnt sub-space (in RGB plane) as the description of the tracked object. Then the eigen-spaces are updated incrementally. The motion parameters values are then predicted for the next frame. Having a computationally inexpensive update algorithm is useful if the tracking algorithm is expected to run in real-time.

Figure 4:
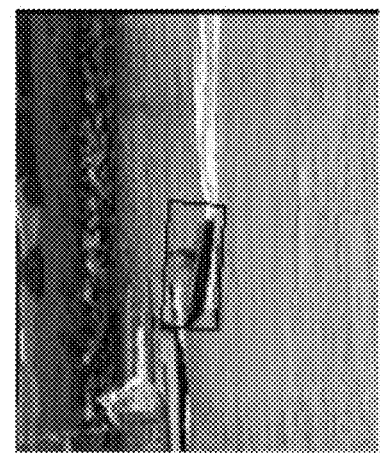
FIGS. 4-6 show example frames from image sequences.
Figure 4:
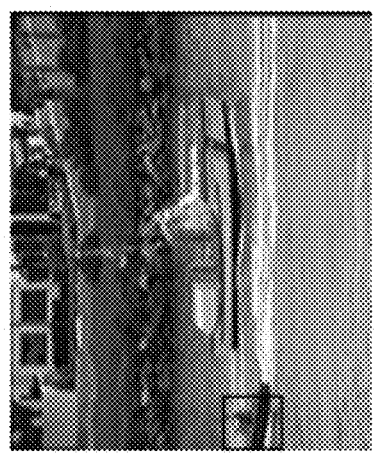
Figure 4:
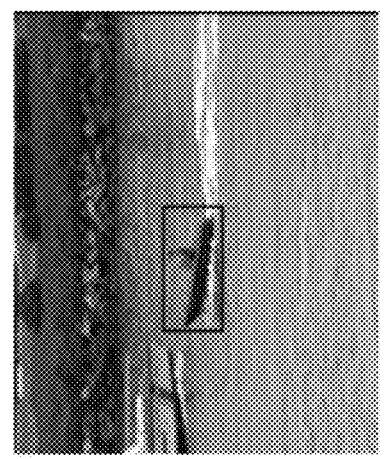
Figure 4:
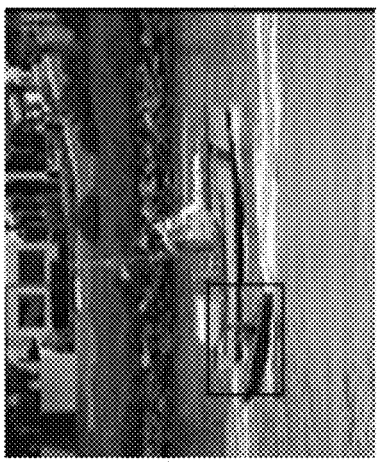
Figure 4:
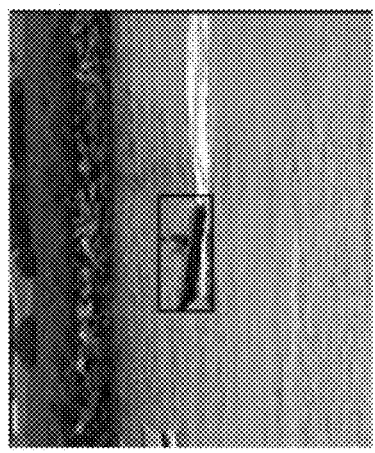
Figure 4:
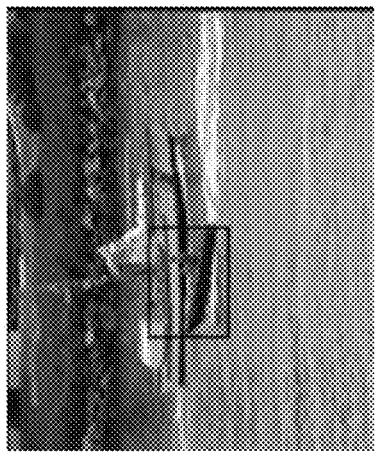
Figure 5:
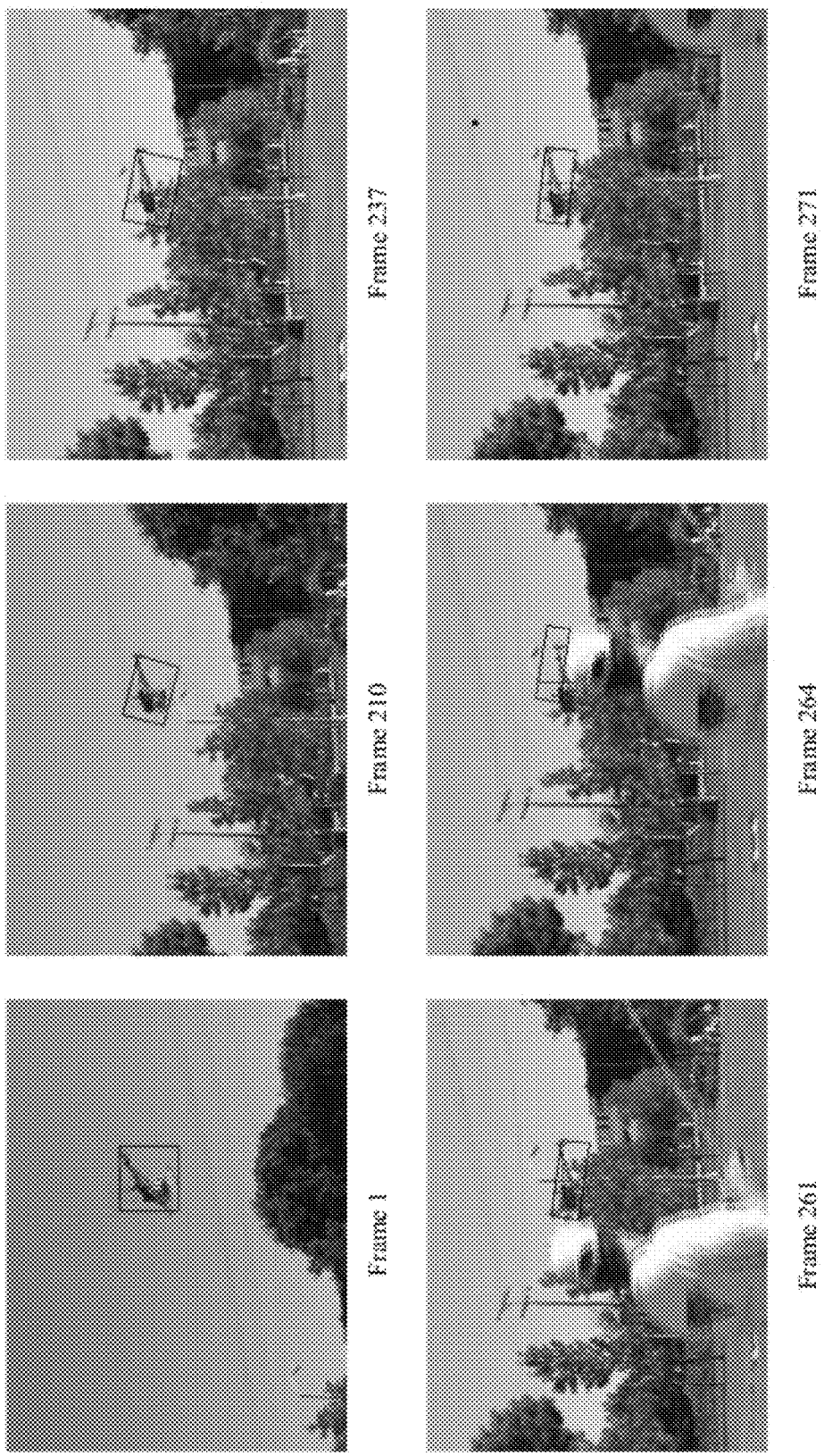
Figure 6:
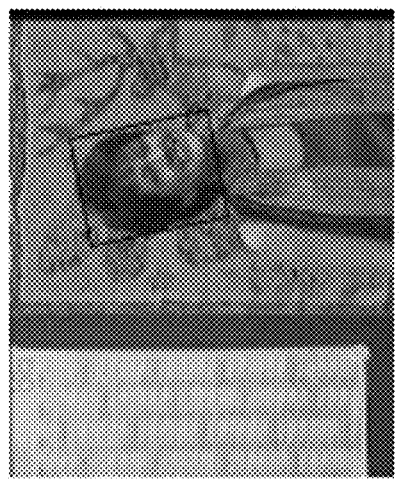
Figure 6:
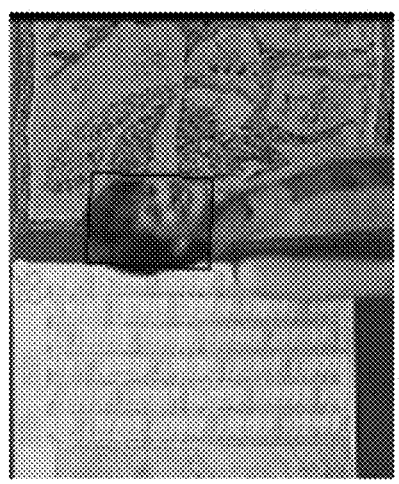
Figure 6:
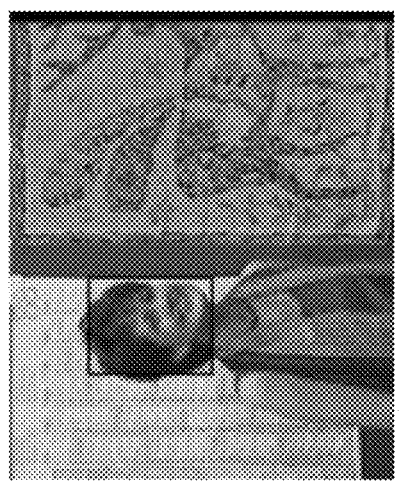

The computational complexity of the algorithm is dominated by the number of windows generated from the sampling. Appearance-based trackers do not handle situations like sudden pose or illumination changes or full occlusion well, but they can handle partial occlusion and gradual pose or illumination changes well. FIGS. 4-6 show example frames from example image sequences that can be well handled by an embodiment of the encoding scheme discussed herein.

The test cases contain scenarios which a real-world tracker encounters, including changes in appearance, large pose variations, significant lighting variation and shadowing, partial occlusion, object partly leaving field of view, large scale changes, cluttered backgrounds, and quick motion resulting in motion blur. Table 1 below compares a predictive and non-predictive framework for a video sequence of a boat called "coast guard" (See FIG. 4) and a video sequence of a person called "hall." In each case, N=150 windows sampled.

TABLE 1

Comparison of Predictive and Non-Predictive Tracking

| Video | Frames Tracked with no prediction | Frames tracked with prediction | Average time/frame no prediction | Average time/frame with prediction |
|---|---|---|---|---|
| Coast Guard | 80 | 100 | 4.2 Seconds | 4.2 Seconds |
| Hall | 82 | 112 | 4.5 Seconds | 4.6 Seconds |

As shown in the above table, incorporation of a predictive framework makes the tracker more robust. The "coast guard" sequence has presence of the boat up to frames 100 out of total 300 frames and then it disappears. In the "hall" sequence, a person (tracking object) appears in frame 25 and disappears after 140th frame, and in that interval it changes poses heavily. If the number of windows to be sampled is increased by 250, no prediction framework (with almost double time complexity) shows almost similar robustness to that of a predictive framework with 150 samples.

In an embodiment, explicit 2D or 3D models of objects are not required. An embodiment detects and tracks an object in a scene by learning the appearance model of each object online using nontraditional uniform norm based subspace. At the same time the object is coded using the projection coefficients to the orthonormal basis of the subspace learnt. In an embodiment, the tracker incorporates a predictive framework based upon a filter, such as a particle filter, for predicting the five motion parameters. The proposed method of combining tracking with compression gives computational advantage and better compression over existing techniques. For example, the proposed method for object coding shows substantially better compression than traditional DCT-block based video coding especially in low-bitrate applications. Instead of requiring explicit models, in an embodiment the system learns the model for the object using a simple but efficient uniform subspace analysis in a moving average fashion. The basic assumption here is that the appearance space (that includes non-rigid motion, different poses, and views of the object) of an object can be represented by a small number of basis vectors. Compared to other appearance-based object coding frameworks, the method is faster and has significantly reduced computational complexity. In conventional approaches, the incremental subspace learning is totally independent of the scheme used for tracking the object. In contrast, in an embodiment a unified approach for tracking and appearance-based object coding is employed. In other words, the same subspace used for tracking is reused for the object coding and thus substantially reduces computation time.

In an embodiment, tracking is bootstrapped by automatic detection of the moving object. As discussed above, the moving object can be detected automatically by analyzing the first three frames. After segmenting the object in the first frame of the image sequences, the object tracking is carried out by incorporating the predictive framework in terms of a particle filter (such as a Kalman filter) for the prediction of the five motion parameters. At each frame, the tracker maintains an up-to-date appearance model, and the tracking task becomes a detection problem.

For each frame, the encoder codes an estimated object $O^n$ by projection coefficients onto the learned subspace and motion parameters. The background is sent as AR coefficients or H.264 I slice coded residual. The coded video stream, at each time instance, contains the compressed information to reconstruct the background, the compressed object difference image $O_d$, and the motion parameters and appearance parameters in the R,G,B subspace of the object. It is to be noted that the appearance parameters need only contain the projection coefficients of the object, rather than the basis vectors of the subspace, since the basis vectors of the subspace can be estimated using the reconstructed objects during decoding at the receiver end.

Figure 7:
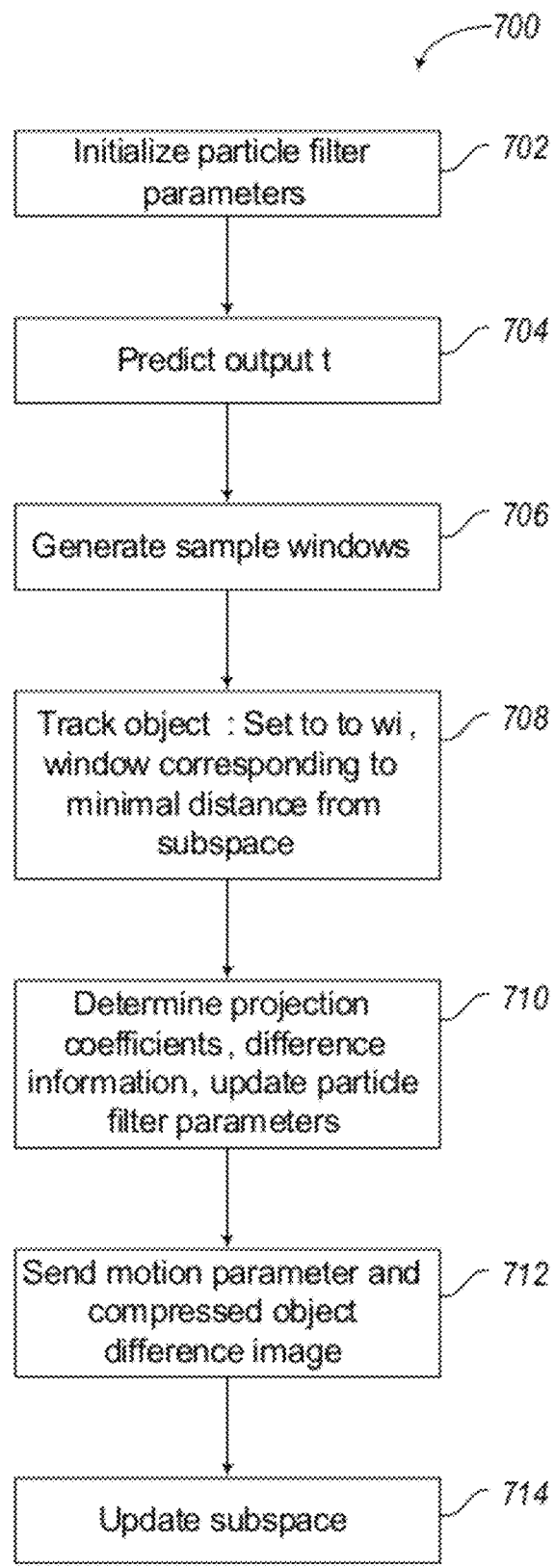
FIG. 7 shows an embodiment of a combined object tracking and coding method.

An embodiment of a combined object tracking and coding method 700 is shown in FIG. 7. The output t is the current state of the tracked object. At 702, the particle filter parameters are initialized. At 704, the output t is predicted using the particle filter, which speeds up the process. At 706, S sample windows {W1, ..., WS} are generated at various locations of different orientations and sizes according to a Gaussian distribution centered at predicted t with a diagonal variance. At 708, the object is tracked. The output t is set to the window corresponding to a minimal distance from the subspace. At 710, the projection coefficient of t to the learnt subspace along with the difference of the predicted and actual t are determined and the filter parameters are updated. At 712, for each frame the residual of t and the projection coefficient are sent as the object into the data stream along with the compressed object difference image. At 714, the subspace is updated. In an embodiment, for the interval of k frames, the observations {x1, ..., xk} are collected from the k previous frames and a subspace update algorithm, for example, a Gram-Smith orthonormalization of the batch means of each size k of the sliding window of length N, is applied.

Figure 8:
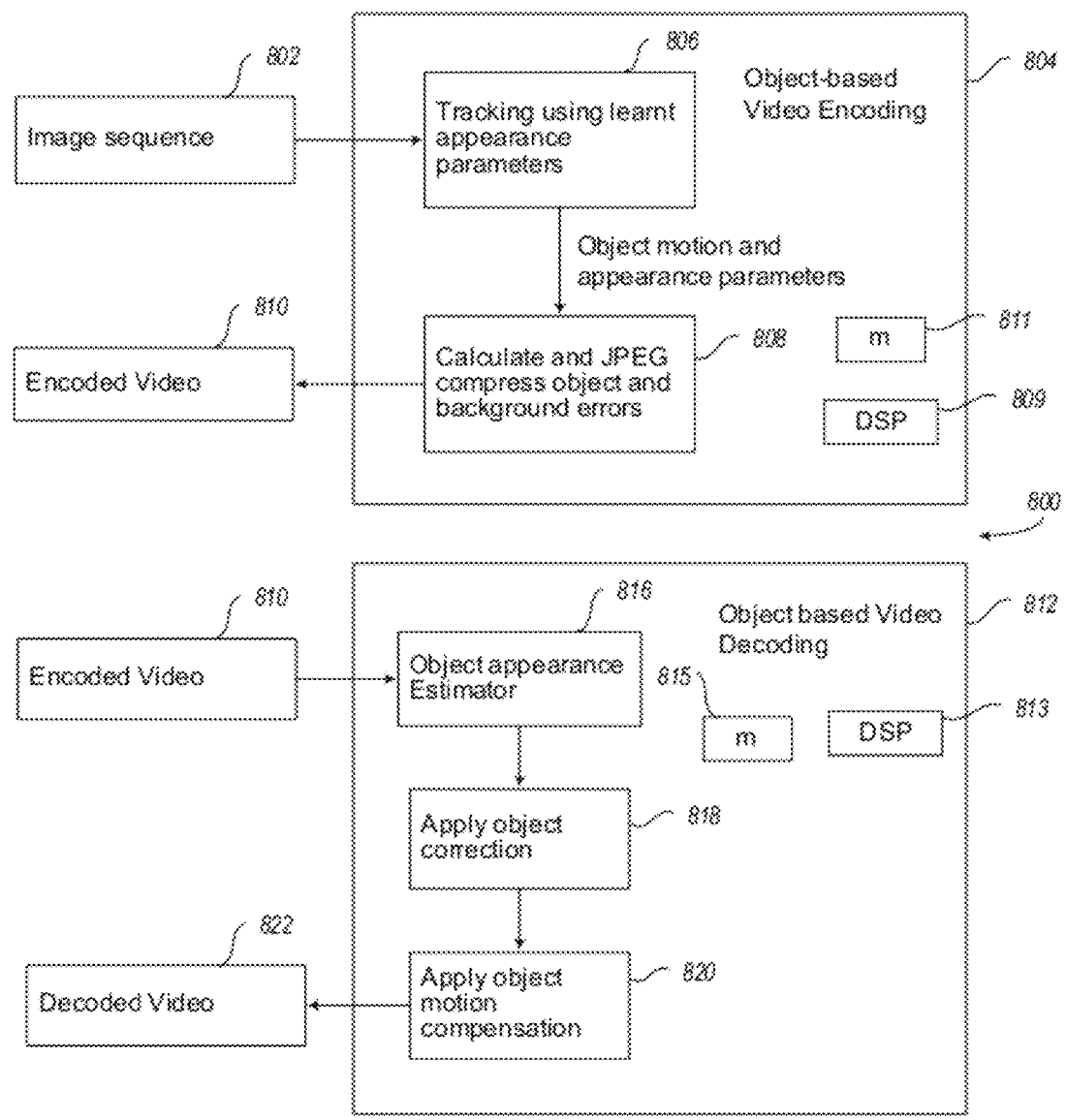
FIG. 8 shows an embodiment of a system for object-based encoding and decoding of an object sequence.

In an embodiment, decoding of the video is achieved by decompressing the first frame and creating an initial object and thus the object's appearance model is initialized. For the subsequent frames, the estimated objects $O^n$ are obtained through its appearance and motion parameters, and the object estimation error is removed by adding the object difference image $O_d$ to obtain $O^r$. Furthermore, the background Bc is reconstructed using decoding of H.264-compatible residual for edge-blocks and using transmitted AR coefficients for non-edge blocks. The video frame is reconstructed by inserting the object $O^r$ into the reconstructed background. The objects appearance model is updated by the same way, and the above process is repeated for all the frames. An embodiment of an object-based compression/decompression system 800 is shown in FIG. 8. An image sequence 802 is received by an encoder 804. A tracking module 806 tracks the object using learnt appearance parameters and generates object motion and appearance parameters. The object motion and appearance parameters are used by an object compression module 808 to calculate the object errors, and to provide feedback to the tracking module 806. The encoder 804 produces an encoded video 810. As illustrated, the encoder comprises a digital signal processor 809 and a memory 811. The memory 811 may contain instructions for causing the digital signal processor 809 to perform the functions of the encoder, such as the functions of the tracking module 806 and the object compression module 808. A decoder 812 receives the encoded video 810. An object appearance estimator 816 is configured to estimate an appearance of an object in the encoded video sequence based on the object appearance parameters. An object correction module 818 is configured to correct errors in the estimated object appearance. A motion compensator 820 is configured to apply motion compensation to the object based on the motion parameters. The decoder 812 as illustrated comprises a digital signal processor 813 and a memory 815. The memory 815 may contain instructions to cause the digital signal processor to perform one or more functions of the decoder, such as the functions performed by the object appearance estimator 816, the motion compensator 820, and/or the object correction module 818. A major difference with other parametric approaches is that such approaches have incrementally learned the appearance of the "tracked" object, i.e. they have used features for object tracking and a different subspace for its coding, whereas an embodiment tracks an object by the online learnt subspace which is also used for the coding framework, which leads to a faster encoder. Although the discussion above addressed tracking a single object, the concept can be easily extendible to multiple objects.

As shown in FIG. 3, in an embodiment the background region information is encoded using a 3-D AR model or a standard encoding scheme, such as the H.264/AVC encoding scheme, depending on frame/macroblock characteristics. As illustrated, the I frames are encoded using the H.264/AVC I slice coder and for the P-frames the macroblocks classified as edge and non-edge blocks based on gradient based edge detector. The edge blocks are encoded using the H.264/AVC P slice coder while the non-edge blocks (termed as texture blocks) are encoded using the 3-D AR model. The texture blocks are first motion threaded using the minimizing sum of absolute differences (SAD) measure. The thread is formed by obtaining the closest match of each block in the immediately succeeding frame and then repeating the process for each subsequent frame. 3-D AR modeling is applied to each of the threads to obtain the parameters for the texture. In one embodiment, the Spatio-Temporal auto regressive model given by:

$$s(x, y, t) = \sum_{i=1}^{o} \sum_{j=1}^{p} \sum_{k=1}^{q} \phi_{i,j,k}(x + \Delta x_i, y + \Delta y_j, t + \Delta t_k) + w(x, y, t) \quad (6)$$

may be employed, where, (x, y, t) denotes a location in space-time, w(x,y,t) denotes a three dimensional white Gaussian noise process and φi's are the coefficients of the model. See M. Szummer and R. W. Picard, Temporal texture modeling. Proceedings, International Conference on Image Processing, 3:823-826, September 1996 and M. O. Szummer, Temporal texture modeling, Master's thesis, Massachusetts Institute of Technology, September 1995. The coded bit-stream includes these coefficients and the motion thread information.

In an embodiment, the background region is encoded using a video coding scheme based on parametric compression of texture. Each macro block is characterized either as an edge block, or as a non-edge block containing texture. The non-edge blocks are coded by modeling them as an auto regressive process (AR). By applying the AR model in a spatio-temporal domain, both spatial as well as temporal consistency may be achieved. Edge blocks are encoded using a standard encoding process, such as the standard H.264/AVC P slice coding. By using the parametric compression of non-edge blocks, up to 54.52% more compression as compared to the standard H.264/AVC at similar visual quality may be achieved.

Complete minimum mean square error (MMSE) reconstruction of texture is not required. A sample from the same random process is sufficient for most applications. Thus by exploiting this property textures can be highly compressed, allowing for greater overall compression at the cost of increased computational complexity. Selected texture regions in a video can be reconstructed from their spatio-temporal neighbors without significant loss of visual quality. The methods for analysis and synthesis of texture can be broadly classified into parametric and non-parametric. Some examples of non-parametric approaches are Markov random field based sampling and inpainting based approaches. While non-parametric methods tend to perform better in terms of visual quality of results, they lag behind parametric methods in terms of compression and reduced computational complexity. By parametrically coding texture a larger compression ratio may be attained. An embodiment uses a simple block selection criteria and an auto regressive model for modeling of texture motion threads. The advantages of using an AR model are that more blocks can be removed than inpainting thus ensuring more compression and also AR models are computationally much less intensive as compared to non-parametric methods.

Image sequences of moving textures can be modeled by Spatio-Temporal Autoregressive models (STAR). AR models however, do not model structured areas (non-stationary information) well. Hence for identifying blocks which can be synthesized by AR model an edge based criteria is employed. To ensure that the moving sequences being modeled have an AR characteristic, motion threads are modeled by AR. Motion threading is a technique that can efficiently handle motion information in a video. Blocks are said to be similar if they satisfy a certain criteria (for example, MMSE). Macroblock based forward motion estimation is performed from first to last frame resulting in a thread like structure. Thus the volume to be modeled by AR is selected by motion threading.

The spatio-temporal auto-regressive model provides many advantages over non-parametric approaches (inpainting, Markov Random Field models etc). Reconstruction via AR is computationally much less intensive. Also AR needs only a few coefficients to generate arbitrarily large texture area, however, parametric methods use a data image large enough to capture all the features of the texture thus restricting the number of blocks that can be removed from a video sequence.

Two criteria are determined when applying the AR model. First is model identification (select model order) and second is the parameter estimation scheme. Model order is determined by examining the three dimensional auto correlation function. If the correlation falls steeply small AR model orders are better. On the other hand wide correlation curves present greater challenge in selecting the AR model order.

Figure 9:
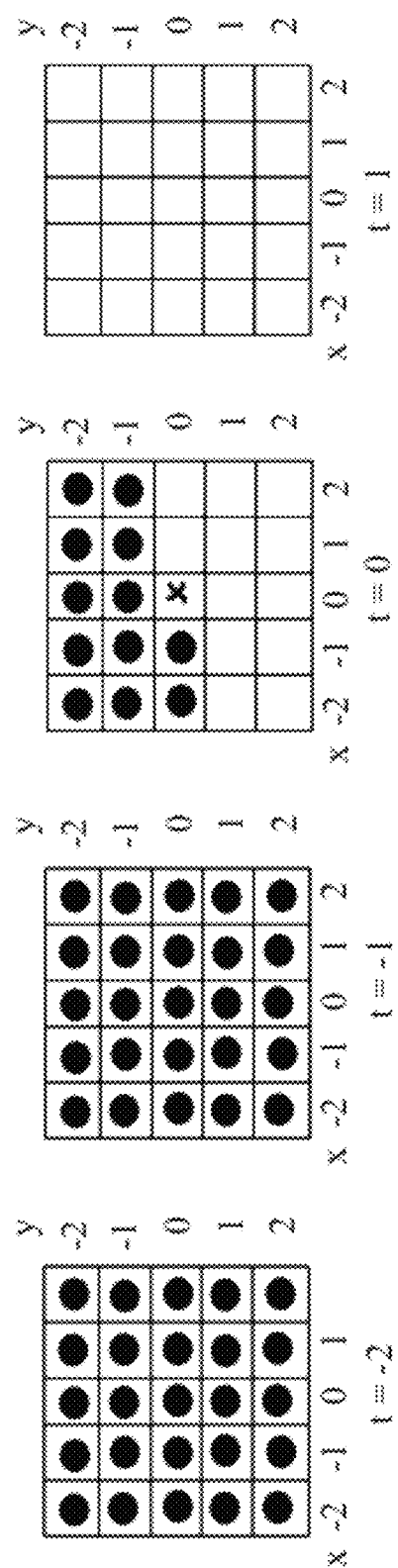
FIG. 9 shows an example of a casual neighborhood.

For the model to be practically implementable, the AR model should be causal. In case of causal STAR models, conditioning neighborhoods are only a subset of the spatio-temporal volume. The neighborhood corresponds to a recursively computable filter. An example of a causal neighborhood is shown in FIG. 9. The block under consideration (at t=0) can use only spatially causal pixels in both x and y directions in the same frame. However, it can use all the pixels from the previous frame which is temporally causal. Thus in case of causal STAR model a subset of all the neighbors is used. For estimation purposes the criteria is to minimize the mean square error, i.e., an expression for the error is minimized with respect to the coefficients.

Synthesis for causal STAR models is straightforward. First, the boundaries of the volume are initialized. Here, Gaussian random noise is used, but almost anything will do, since the initial conditions die out gradually. For synthesis, each pixel is predicted as a linear combination of its (already synthesized) neighbors and of Gaussian random noise with the same variance as the innovation process w(x).

In an embodiment, I-frames are coded using H.264/AVC I slice coder and P-frames are encoded using a combination of H.264/AVC P slice coding and AR modeling. Thus all the compression over H.264 is achieved in P frames. Each P-frame is divided into non overlapping 16×16 blocks. Each block is then classified as an edge or a non-edge block by means of a gradient based edge detector. To preserve edge information and transitions among different regions, edge blocks are encoded by standard H.264/AVC P slice coder. The remaining blocks (called the texture blocks) are then processed further using the proposed scheme. Block based motion threading is performed on texture blocks and each of the threads is modeled as AR process using 3-D AR model. The coefficients so obtained are sent along with thread information at the encoder side. For each of the blocks (to be synthesized by AR) a search is performed to determine if the initial condition pixels (taken from causal neighborhood) have an edge. Presence of edge implies that these pixels cannot be used to initialize the model and so the block under consideration is treated as an edge block and encoded by H.264. To account for the cases where the performance of AR model is not satisfactory, residues are calculated for each block to be synthesized and energy of residues is found. If the energy exceeds a threshold, the block is treated as an edge block and encoded using H.264 P slice coder. The overall approach has been summarized in FIG. 3. The implementation details of an embodiment of an AR model are described below.

In any texture reconstruction scheme, isolation of the region that can be successfully synthesized is very significant for good reconstruction. Hence selection of blocks for encoding by proposed scheme becomes an important criterion in the encoder. In an embodiment, a block based categorization has been done to identify the regions amenable to reconstruction via AR model.

For identifying edge blocks a gradient may be used as the measure. Here classification may be done on the basis of edges since highly structured textures and edges (non stationary information) are not well synthesized using AR models. To determine whether a given block is edge block or not, the magnitude of gradient over all the pixels in that block is summed. If the sum is greater than a given threshold, the block is categorized as edge else it is classified as a non-edge texture block, which can be removed.

Figure 10:
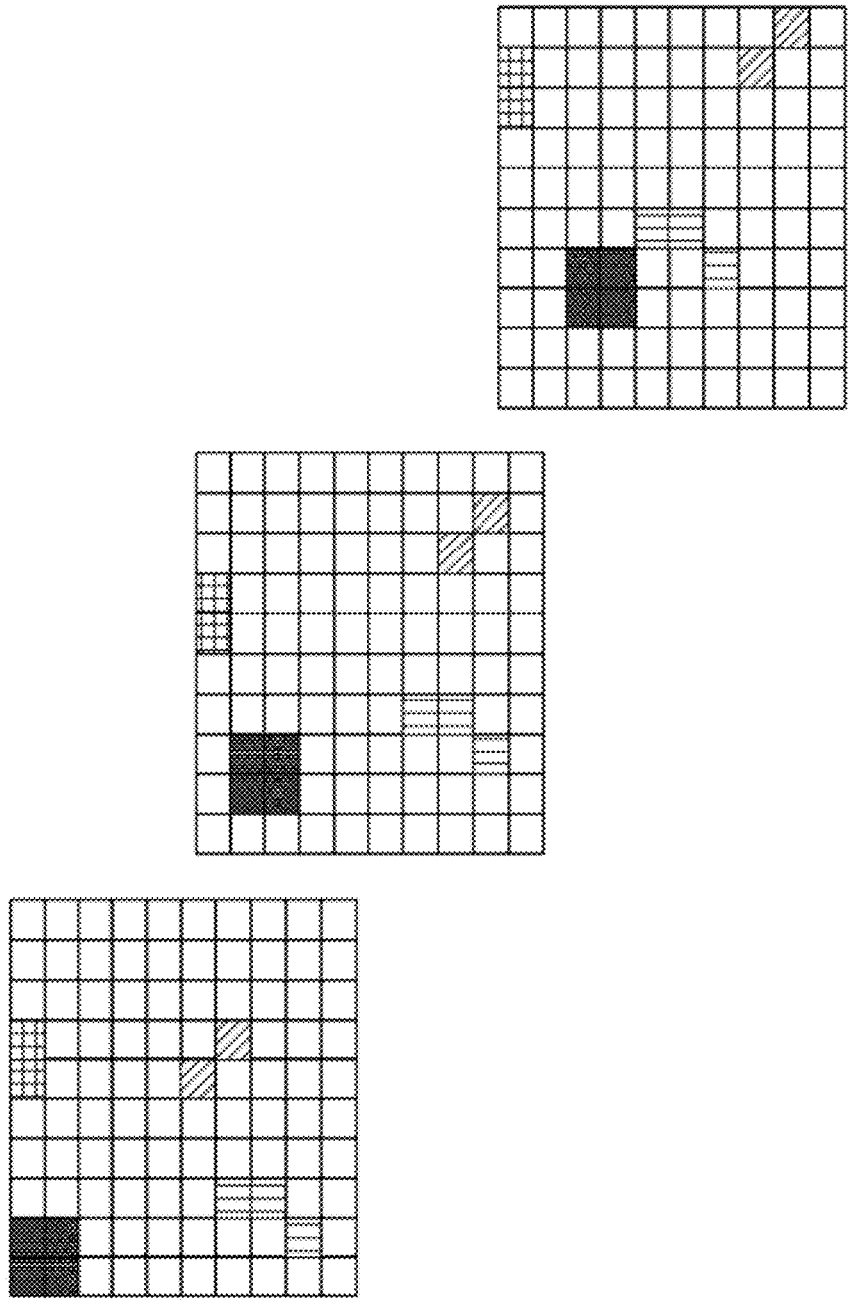
FIG. 10 shows an example of motion threading.

To avoid possible temporal inconsistency in the synthesized result, motion estimation may be employed at the encoder side. Temporally sequential blocks on a motion trajectory are treated as a candidate for texture synthesis via the same AR model. In this way, texture synthesis can be performed on a more global level to help spatial and temporal consistency. Block based backward motion estimation may be performed on non edge blocks only. Since the edge blocks are coded with H.264 there is no need to explicitly handle motion compensation for them. The motion compensation for edge blocks is being handled by H.264. Thus, each type of blocks may be motion compensated among their own category. A criteria for motion threading is minimizing sum of absolute differences (SAD). For creating the thread closest match of each block is found in immediately preceding frame and so on. Integer-pixel accuracy is maintained in motion threading. Afterwards AR modeling is applied on each of the threads. FIG. 10 shows an example of motion threading. The blocks having the same hatching are similar according to chosen criteria and hence belong to the same thread.

Each of the threads found in the previous step are modeled using the Spatio-Temporal Auto-Regressive Model. As discussed previously, this model is a three dimensional version of the regular AR model. Every pixel is modeled as a linear combination of neighboring pixels in time and space plus a noise term. The coefficients are sent along with other data to the decoder.

Synthesis of blocks using AR model is not satisfactory if the initialization pixels are not of the same texture type or the block cannot be effectively modeled as AR. An example of such a block is one having non-stationary data. To ensure that these blocks do not deteriorate the quality of reconstruction, an approach has been developed to isolate and encode them via standard encoding, such as H.264 P slice coding. For each block to be generated we detect if the pixels used to provide initial conditions have an edge. Edge detection may be performed by using the gradient based approach discussed previously. If an edge is present, it implies that the initialization pixels are not all of the same type as the texture in block and so they cannot be used to initialize the model. Hence, the block is instead treated as an edge block and encoded using H.264 P slice coder. To detect cases where performance of AR model is not good despite proper initialization, the blocks may be locally decoded and residues found by inverse filtering the motion thread.

If the residue energy exceeds a threshold, the block is encoded using, for example, H.264 P slice coder. The threshold for residue energy may be kept high to ensure that only blocks with significant distortion are removed. Removal of blocks in the manner suggested above helps in maintaining the visual quality of reconstruction.

In an embodiment of a decoder, I frames and the background edge and filtered blocks of P frames are reconstructed by H.264 decoder. The remaining P frame background blocks are then synthesized via the AR model. After texture synthesis, completed pictures are stored to be used for decoding subsequent pictures. Note that the texture regions may be reconstructed using the I frame in the group of frames which was coded and reconstructed with MSE criterion in H.264 I slice coder. The motion thread information indicates which blocks are to be synthesized via AR model. For synthesis the following steps are carried out. If the error between the block to be synthesized and the preceding block in the motion thread is less than a threshold, then the previous block is simply copied rather than using AR model. This helps in improving fidelity as well as in maintaining temporal consistency. However, if error exceeds the threshold, AR synthesis is used. For each pixel the spatially neighboring pixels in that frame as well as temporally neighboring pixels (according to the motion thread) in the first frame are used. This process is carried out until all the blocks have been regenerated.

Figure 11:
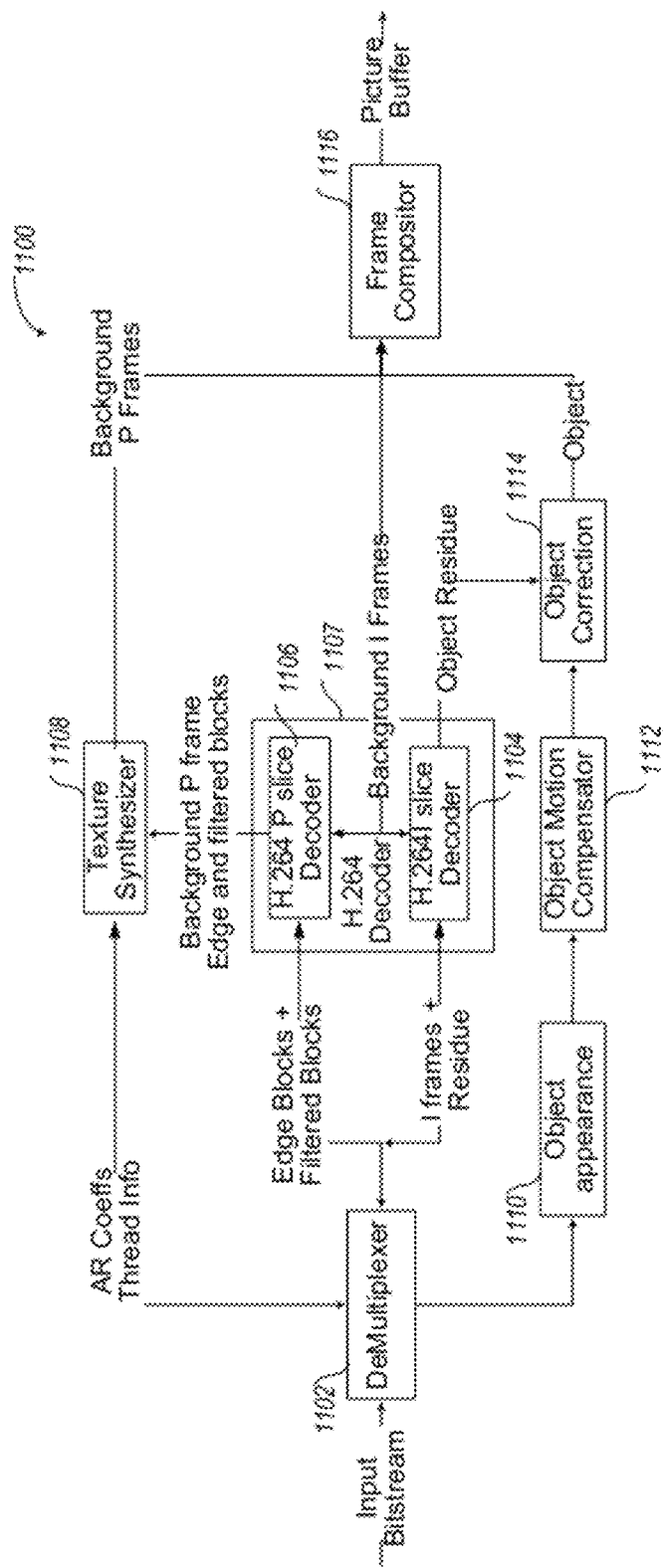
FIG. 11 shows in block form an embodiment of a decoder configured to decode a signal encoded by, for example, the embodiment of FIG. 3.

FIG. 11 illustrates an embodiment of a decoder 1100. At the decoder 1100, a demultiplexer 1102 splits the compressed input bit stream into an H.264 bit stream, AR coefficients, thread information and object information. Background I frames are reconstructed by a H.264 I slice decoder 1104 and the edge blocks of P frames are reconstructed using a H.264 P slice decoder 1106. As illustrated, the H.264 I slice decoder and the H.264 P slice decoder are combined into an H.264 decoder module 1107. Background non-edge blocks are synthesized by a texture synthesizer 1108 which is configured to use the AR coefficients and the thread information to synthesize the background non-edge blocks based on the spatio-temporal AR model. In some embodiments, background non-edge blocks which do not satisfy a criteria may also be reconstructed using the H.264 P slice decoder 1106. The texture regions are synthesized using the information from the decoded I frame (taking motion threading into account) and information from neighboring pixels in that frame. This process is carried out until all the texture blocks have been regenerated. For the object reconstruction, the subspace learning is the same as in the encoder side. So, without sending the basis vectors, using only the transmitted projection coefficients to the learnt subspace, the object may be reconstructed. An object appearance estimator 1110 is configured to estimate an appearance of an object in the encoded video sequence based on the object appearance parameters. An object motion compensator 1112 is configured to compensate for motion based on the transmitted motion parameters and an object correction module 1114 is configured to add the residual decoded by H.264 I slice decoder to the object. As illustrated, the object motion compensator 1112 provides an output to the object correction module 1114. In other embodiments, the object motion compensator 1112 may instead receive an output from the object correction module 1114. In other embodiments, the object motion compensator 1112 and the object correction module 1114 may be combined. A frame compositor 1116 is configured to receive the background I frames, the background P-frame edge blocks, the background P frame non-edge blocks, and the object and to generate a composite output frame.

The experimentation results are as follows:

TABLE 2

Summary of Representative Results

| | | Our Scheme | | Compression | |
|---|---|---|---|---|---|
| Sequence | H.264 | Full Residue | Scale 1 residue | full Residue | scale 1 residue |
| container | 307 KB | 288 Kb | 242 KB | 6.19% | 21.17% |
| Sky Diving | 283 KB | 203 KB | 186 KB | 28.27% | 34.28% |

Figure 12:
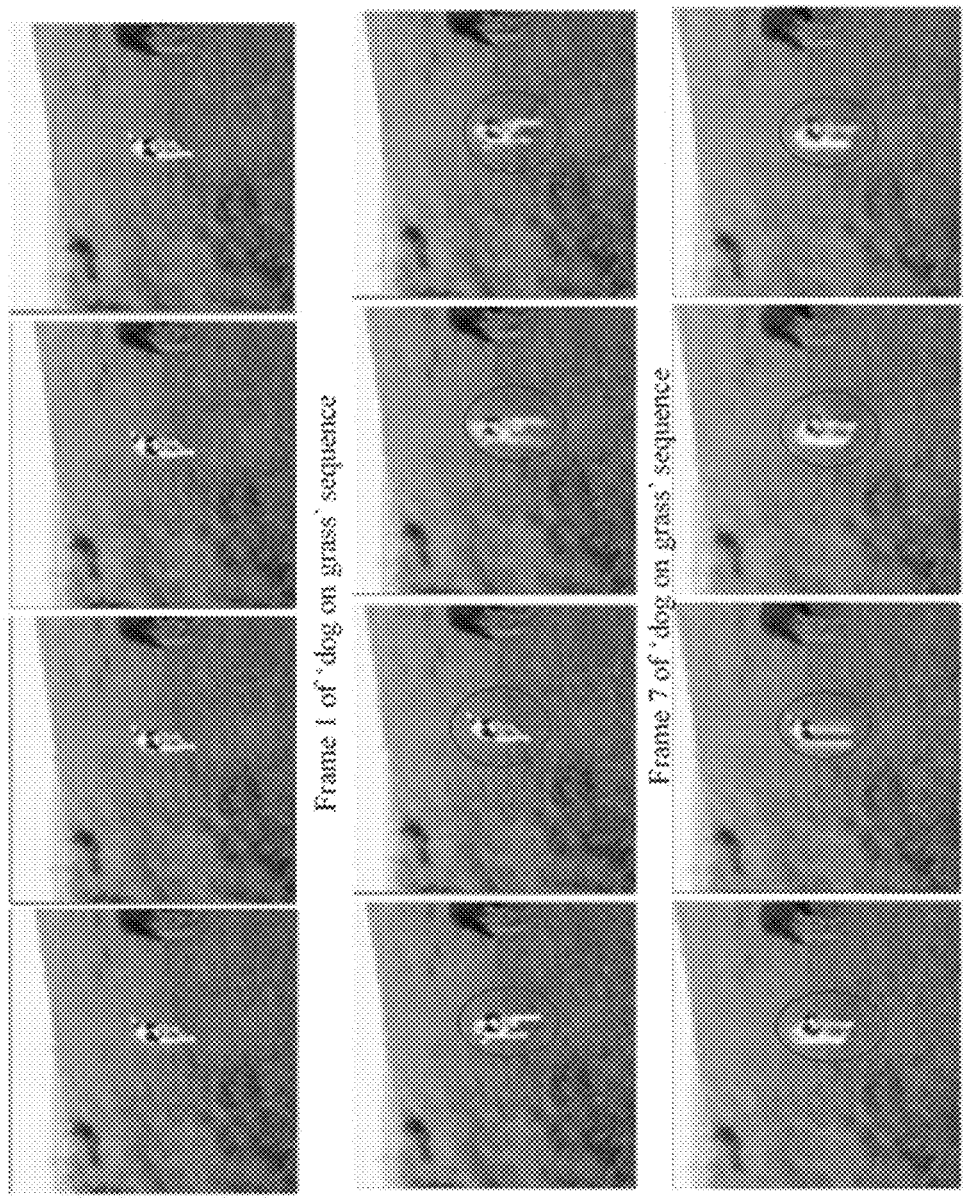
FIG. 12 shows frames of a sequence reconstructed by an embodiment as compared to H.264/AVC.

The size of the video has been found by adding the number of bits required for I frames, P frames edge blocks, filtered blocks, AR coefficients and motion threading information, and Huffman encoded parameters for state vector and projection coefficients to the subspace. Some frames of the decoded sequence have been shown in FIG. 12. Columns from left are: (1) Original video, (2) H.264 with maximum possible compression (QP 51), (3) Object coding with maximum possible compression (no residual), (4) Object coding with small bits residual coding (lowest most quality scalability in error residual). These figures show after tracking without using the residual data in the decoder, object reconstruction is quite good in an embodiment. H.264 frame 7 has almost the same object shape as that of the first frame because of insufficient residual, where as even with no residual object coding an embodiment retains the essence of the object shape. Frame 13 clearly illustrates the superiority of an embodiment of the proposed architecture (as opposed to H.264) for low bitrate coding. The visual quality of the frame reconstructed using standard H.264 is unacceptable, whereas the details of the object are discernible in the reconstructed frame of an embodiment.

The encoder 300 of FIG. 3 may comprise a digital signal processor and a memory containing instructions to cause the encoder 300 to perform the functions of the various modules of the encoder 300 (see the digital signal processor 809 and memory 811 of FIG. 8). Similarly, the decoder 1100 of FIG. 11 may comprise a digital signal processor and a memory containing instructions to cause the decoder 1100 to perform the functions of the various modules of the decoder 1100

(see the digital signal processor 813 and memory 815 of FIG. 8). Some embodiments may combine encoders and decoders into a combined system, such as the encoder 300 of FIG. 3 and the decoder 1100 of FIG. 11. Such a combined system may contain one or more processors and memories configured to perform the various functions of the encoder and decoder.

As mentioned above, perceptual redundancy removal is directed to learning a scene/object through an appearance model and capturing motion through generalized motion models of objects present in the scene. In an embodiment, computer vision technologies may be employed. In an embodiment, a coded video sequence format described herein facilities providing a "network friendly" video representation supporting appearance and generalized motion of one or more objects, such as one or more regions of interest (ROI). In an embodiment, a video bit-stream supports an encoded bit stream based on an object appearance model and a generic motion model, as discussed in more detail below.

The signal-to-noise ratio (SNR) scalability in scalable video coding (SVC) employs enhancement layers having a same level of resolution, while a higher quality scalability may be employed in a ROI. The syntactical structure of SVC provides an option for defining a ROI in multiple of macroblock units and in special case a rectangular window by specifying a cropping window. However, edges of the cropping window may not be on a macroblock boundary. In addition, specifying the orientation of the window in two-dimensional space is not supported in the current SVC framework.

The video coding standard H.264/MPEG-4 part 10 (also named as Advanced Video Coding AVC), developed by ITU and ISO, is frequently superior to other video coding techniques such as MPEG2 or H.263 in terms of compression efficiency by virtue of the collection of several sophisticated tools. H.264 is often assumed to be the best of the current standards in removal of spatial, temporal and statistical redundancies. At the same time, H.264's Network Abstraction Layer (NAL) makes H.264 a "network-friendly" video representation.

Video coding techniques may employ computer vision techniques to address the perceptual redundancies. Reconstruction of an ROI with higher visual quality with even higher compression compared to H.264 is desirable. Parametric video coding using appearance-based object-coding models may be employed to facilitate obtaining better quality and higher compression.

The inventors have discovered features that may be employed in embodiments of appearance-based object-coding model to facilitate obtaining better quality with higher compression. For example, the capturing/estimating/handling of generalized motion of an ROI need not be limited to motion as represented by an (x,y) pair called a motion vector in the traditional video compression literature. Instead, object motion models may also capture translation, rotation, zoom in, zoom out, etc. In addition, instead of treating pixels individually for prediction purpose, in an embodiment an appearance-based model may capture an entire ROI as a single entity. In addition, appearance-based reconstruction closer to the actual object definition facilitates higher visual quality, and the generalized motion model facilitates better prediction of a current object, and achieving a lower residual signal. Removal of perceptual redundancies may be handled by an appearance-approach.

Perceptual quality-based ROI modeling may employ a number of techniques, including in principle any of the techniques described in "Survey of Appearance-Based Methods for Object Recognition," Roth, et al., Technical Report ICG-TR-01/08, Jan. 15, 2008. For example, region detection techniques such as corner detection, region-based detection, entropy-based salient region detection, human visual attention detection, Harris or Hessian point-based detection, difference of Guassian point detection, Harris or Hessian affine invariant region detection, maximally stable extremal region detection, intensity based region detection, edge-based region detection, etc., may be employed. Different region of interest descriptors may be employed, such as distribution-based descriptors, filter-based descriptors, etc. For example, distribution-based descriptors such as scale invariant feature transformation (SIFT) descriptors, principal component analysis (PCA) SIFT descriptors, gradient PCA descriptors, gradient location-orientation histogram (GLOH) descriptors, spin image descriptors, shape-context descriptors, local binary pattern descriptors, etc., may be employed. Filter-based descriptors such as differential invariant descriptors, steerable filter descriptors, complex filter descriptors, etc., may be employed. Other descriptors may be employed, such as cross-correlation descriptors, moment invariant descriptors, etc. Global-appearance based methods for object recognition, such as the subspace methods discussed in Roth, etc., may be employed.

The inventors have discovered that adding a scalability layer in SVC for a perceptual quality scalability for a region of interest facilitates the use of a ROI-based framework within an H.264/AVC scheme for perceptual quality improvement. Moreover, embodiments may be used with a wide variety of video-coding methodologies, such as conversational (video telephony), non-conversation (storage, broadcast, streaming, etc., methodologies. Existing syntactical support of H.264/SVC may be employed, enhanced or extended in embodiments to handle ROI-specific data.

There have been some efforts in the domain of ROI-based H.264 coding. Amongst them a method based on the visual perceptual mechanism of human visual system (HVS) has been proposed in Yayu Zheng, Jie Feng, Hanjie Ma, Yaowu Chen, "H.264 ROI Coding Based on Visual Perception", VIE08. Zheng proposes two stages. First, by integrating a texture perceptual map and a motion perceptual map, a visual perceptual map is computed, which denotes the visual importance of various regions in the image. Then, a frequency coefficient suppression method is used to perform H.264 ROI coding jointly with the visual perceptual map. Zheng's method saves bits for a macroblock determined to be of low importance and uses those extra bits for a macroblock determined to have high importance. Zheng claims, compared with conventional H.264 coding method, to improve the visual quality of images and obtain a high peak SNR gain up to about 1.2 dB for visually important regions. However, in Zheng the foreground is nothing but the moving macro-blocks and background is also treated with different priority areas, so the method proposed in Zheng is the same as H.264 and is not parametric at an object-level. Thus, the method of Zheng does not support appearance-based object coding. Another work, Sebastiaan Van Leuven, Kris Van Schevensteen, Tim Dams, and Peter Schelkens, "An Implementation of Multiple Region-Of-Interest Models in H.264/AVC", SITIS 2006, proposes an extensible ROI (xROI) to smooth the transition between the ROI and non-ROI part of the video. Flexible macroblock ordering (FMO) is used for ROI-coding. As in Zheng, Van Leuven defines an appearance-based object by an integer number of macroblocks. In reality the minimum bounding rectangle of a visual object may be an oriented rectangle, not necessarily restricted to macroblock boundaries like in Zheng and Van Leuven. Primarily, Zheng and Van Leuven are directed to quantization parameter adjustment in different macroblocks of a picture.

A multi-scale approach towards video coding may provide a high-quality for specified region of interest. Spatially scalable ROIs can be obtained at very good quality by using selective encoding for each region in the higher resolution layer. ROI-coding in SVC (See Annex G of the H.264 standard) is enabled by Scalability information SEI message syntax (section G.13.1.1) by use of several parameters like sub_pic_layer_flag, sub_region_layer_flag and iroi_division_info_present_flag. The SEI message provides scalability information for subsets of the bit stream, specifically subsets of the target access unit set. The sub_pic_layer_flag and sub_region_layer_flag broadly specify information related to sub-picture scalable layer and dependency with other scalable layers. The possible sub-picture area associated with this parameter is a rectangular area of slice group map units inside the layer frames. The sub-picture area is specified by the syntax elements horizontal_offset, vertical_offset, region_width, and region_height. However, a way to specify a two-dimensional orientation of a ROI is not provided. The iroi_division_info_present_flag provides the specification on dividing along slice group map unit boundaries into multiple rectangular regions of interest, referred to as interactive regions of interest (IROIs), and the IROI division information is explicitly signaled in the scalability information SEI message. The intension is while invoking the sub-bit stream extraction process, no sample value outside a particular IROI and no sample value at a fractional sample position that is derived using one or more sample values outside the particular IROI is used. The iroi_grid_flag specifies how the ROI division information is indicated for the current scalable layer. So in essence a ROI in SVC is always defined by rectangular areas by some means, which do not support specifying a two-dimensional orientation of a ROI. While pixel-based coding and reconstruction is allowed in a ROI, too, the ROI is not coded using its appearance.

The JPEG2000 standard (see, ISO/IEC 15444-1, "JPEG2000 image coding system—part 1: core coding systems", Technical Repository, ISO 2000, and ISO/IEC JTC1/SC20 WG1 N2000, "JPEG2000 part 2 final Committee draft", Technical Repository, ISO 2000) also discusses regions of interest. In that context, a ROI is a part of an image that is coded earlier in the code-stream than the rest of the image or background. Information associated with ROI precedes information associated with background. Two types of regions of interest are defined, one static, i.e. a ROI decided and coded once for all at the encoder side, and second one is dynamic where ROI can be decided and decoded on the fly from the same bit stream. Wavelet coefficients that will contribute to ROI region pixels are tracked. General SHIFT or MAXSHIFT methods are employed to code a ROI. The later supports arbitrary ROI with minimum complexity, i.e., there is no need to send the shape information. The ROI mask is a bit-plane indicating which coefficients have to be transmitted. The shape mask is not needed both in the encoder and the decoder and the ROI mask is needed only at the encoder and not in the decoder, and the decoder eventually can be as simple as non-ROI capable decoder. But for multiple ROIs with different degrees of interests, ROIs are handled better using the General SHIFT method, having the overhead of ROI MASK processing. The decoder can detect in which sub-band the ROI will begin, due to scale value transmission. This is an added benefit of the wavelet-based coding of JPEG2000. But performance of this scaling-based ROI coding degrades dramatically as the number of ROIs increases. Non-contiguous ROIs can negate the increase in quality in ROIs. In contrast, in at least some embodiments described herein, there is no need to transmit a shape mask, and the quality of ROIs may be maintained while increasing the number of regions of interest.

The MPEG-4 visual standard (see ISO/IEC 144962-2, Information Technology—coding of audio visual objects—part 2, visual, MPEG4 Visual, 2001) discusses sprite coding and global motion compensation. Sprite coding uses affine mappings of parts of the background to the displayed scene at different time instances. The decoder can vary the mapping to zoom in/out, pan left/right. Global motion compensation is performed using 8-parameter projective mapping. The MPEG4 standard also discusses visual object coding. But the generalized motion model is not applied at an object-level. For objects, the motion model used in MPEG4 is purely translational. Coding of pixels of an object is no different in principle from coding of pixels of background. Additionally a shape mask is transmitted for each object. In reality, an object or ROI can span a number of complete and partial macroblocks. While there have been attempts to work on a ROI-based approach where the ROI may not necessarily have to be a region aligned with macroblock boundaries (see ICPR08 and ICPR04), these approaches have limited flexibility and do not combine object-appearance modeling and generic motion modeling.

In an embodiment, a video-bit stream supports both object-appearance modeling and generic motion modeling. It is noted that object-based approaches may be important for content based video coding and retrieval.

The inventors have discovered that a ROI-based perceptual quality scalability layer can be added in the SVC stream by, for example, extending the syntactical support for one Network Abstraction Layer (NAL) unit type. As specified in table 7.3.1 of H.264 standard, the NAL unit type 20 is used for coded slice extension. In an embodiment, the NAL unit type 20 is employed to extend the syntactical support. The identifier for the perceptual quality, the perceptual_quality_id, may be added in the nal_unit_header_svc_extension( ). Section G.7.3.1.1 describes the syntax of nal_unit_header_svc_extension( ), where in there are two reserved bits. In an embodiment, the perceptual quality id can be signaled by using these two bits. The section G.13.1.1 in the standard describes Scalability information SEI message syntax. The scalability information SEI message provides scalability information for subsets of the bit stream. However, there is no space in the standard SEI message to accommodate the orientation angle. Only the horizontal_offset, vertical_offset, region_width, and region_height are the possible data which can be inserted into the SEI. In an embodiment, oriented rectangular ROI may be processed by using a new SEI message structure (adding an orientation parameter, theta). The tracking of a ROI may be done using any tracking methodology. For example, embodiments of tracking mechanisms described above may be employed.

In an embodiment, the prediction mechanism is defined in the area of a ROI intended to have higher perceptual quality. In an embodiment, the prediction mechanism of the first enhancement layer employs appearance learning of ROI with base-layer decoded pixels. The higher the enhancement layer number the higher the number of parameters of the ROI used in object reconstruction. For example, in a scenario of appearance-based modeling such as incremental PCA, the more the number of basis vectors used for reconstruction, the higher the quality of the reconstructed ROI.

Figure 13:
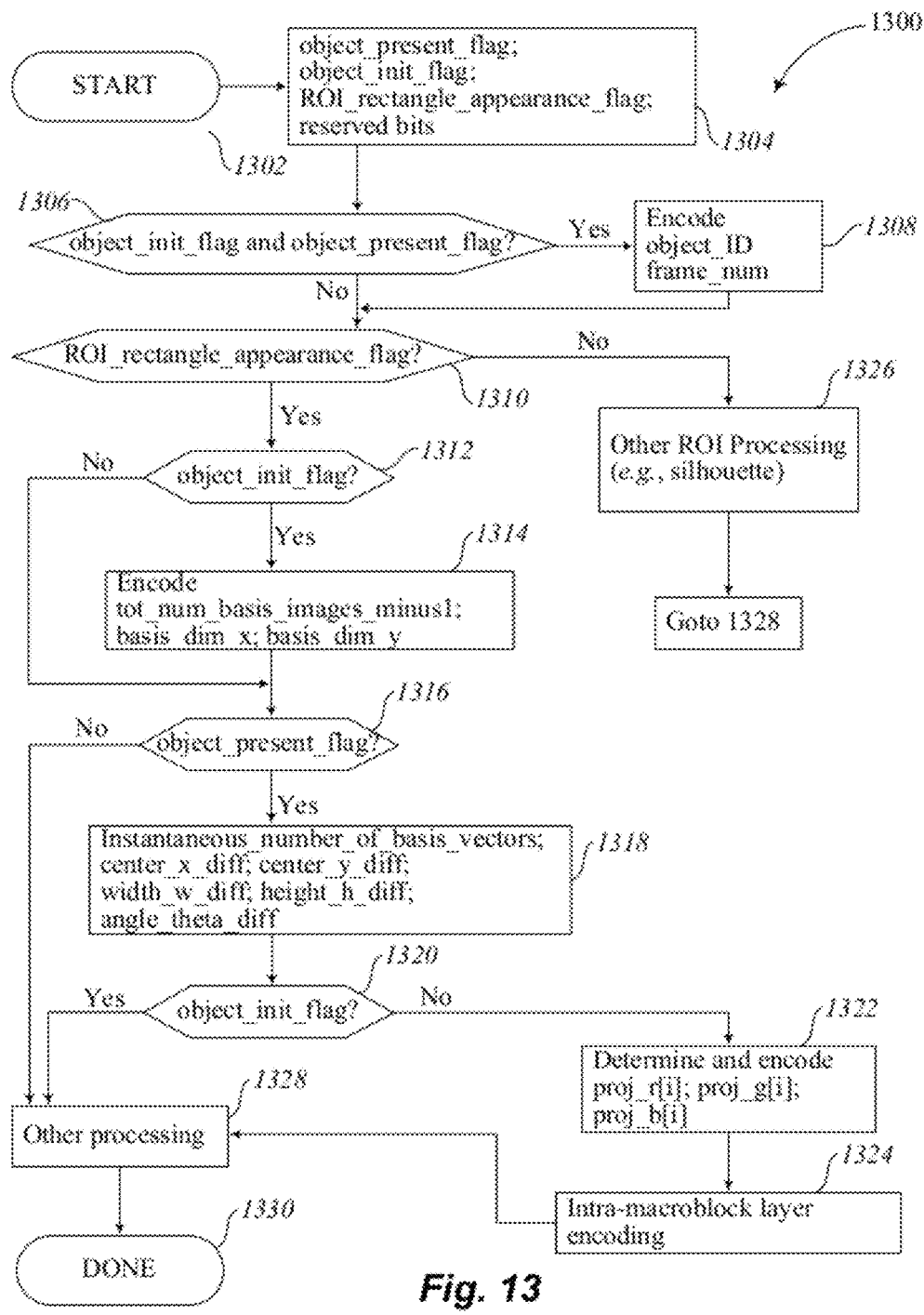
FIG. 13 illustrates an embodiment of a method of encoding a video sequence with motion parameters and appearance parameters of ROI(s), including at least two object orientation parameters for each ROI.

FIG. 13 illustrates an embodiment of a method 1300 of generating a raw byte sequence payload encoding an object based on an appearance model and a generic motion model. Embodiments of the method 1300 illustrated in FIG. 13, and the raw byte sequence payloads generated by the method 1300, may be employed, for example, in the embodiments of encoders and decoders illustrated in FIGS. 3 and 11, and in the embodiment of a system of FIG. 8. The following syntax applies to the embodiment as illustrated in FIG. 13.

Object_present_flag specifies whether the current object is present in the frame and not occluded. If set to 1, then the incremental appearance model update will take place. Otherwise, 0 means no appearance model update needs to occur.

Object_init_flag specifies whether the object has just been detected, so in the parameter NAL warping parameters will be present. If the object has just been detected no projection coefficients are transmitted as the object is not coded with regard to the subspace yet. If the object has not just been detected, then projection coefficients are present in the ROI NAL.

ROI_rectangle_appearance_flag specifies the appearance-based modeling of the oriented rectangular ROI.

Reserved bits are for future use.

Object_ID specifies the identifier of the object. Each initialized object has unique id until the next initialization step. The valid range of an embodiment may be, for example, 0 to 31.

Frame_num specifies the associated frame number to which the ROI belongs.

tot_num_basis_images_minus1 specifies the number of basis vectors to retain for unified tracking and coding. The valid range of an embodiment is, for example, 0 to 7. Thus, the maximum possible number of maintained basis vectors will be 8.

basis_dim_x specifies the width of the incremental basis images.

basis_dim_y specifies the height of the incremental basis images.

The maximum basis image height and width may have maximum value in an embodiment of, for example, 1024. The basis image dimension for modeling each ROI can be different.

Instantaneous_number_basis_vectors specifies the number of instantaneous basis images for object reconstruction. This value ideally is the minimum of the difference of the current frame number with the frame number in which the object is initialized and the number of maximum basis images to maintain. (e.g., Min[(current frame number−object initialization frame number), max basis images]). It is less than or equal to the tot_num_basis_images_minus1 specified.

center_x_diff specifies the differential x-ordinate value of the center of the bounding box defined as Region of Interest (ROI) with respect to its value in the previous frame.

center_y_diff specifies the differential y-ordinate value of the center of the bounding box defined as Region of Interest (ROI) with respect to its value in the previous frame.

width_w_diff specifies the differential width of the bounding box defined as Region of Interest (ROI) with respect to its value in the previous frame.

height_h_diff specifies the differential height of the bounding box defined as Region of Interest with respect to its value in the previous frame.

angle_theta_diff specifies the differential 2D orientation angle between width-axis and positive x-axis of the bounding box defined as Region of Interest with respect to its value in the previous frame. The allowable values of an embodiment are, for example, 0 to 360 (measured in degrees). The width axis is any line parallel to the width side of the oriented rectangle.

proj_r[i] specifies projection coefficient of the object with Object_ID to the i-th basis of the red color plane. In an embodiment, this is a single precision floating number treated as fixed point while writing into the bit stream.

proj_g[i] specifies projection coefficient of the object with Object_ID to the i-th basis of the green color plane. The value range and interpretation of an embodiment is similar to proj_r.

proj_b[i] specifies projection coefficient of the object with Object_ID to the i-th basis of the blue color plane. The value range and interpretation of an embodiment is similar to proj_r.

The method 1300 starts at act 1302, where initialization and housekeeping functions may be performed. The method 1300 proceeds from 1302 to 1304.

At act 1304, the values of one or more variables employed by the method are determined or obtained. As illustrated, the values of object_present_flag, object_init_flag, ROI_rectangle_appearance_flag, and optionally variables stored in reserved bits, such as other flags, etc., are determined or obtained. For example, the first three frames of a sequence of frames may be used to identify an object or ROI, as discussed above. If an object or ROI is detected, the object_present_flag and the object_init_flag for the third frame may both be set. In another example, in an embodiment it may be desirable for identified ROI to be processed as rectangular regions, in which case the ROI_rectangle_appearance_flag would be set. In some embodiments, optionally one or more of such values may be encoded in the bit stream or in a network abstraction layer header. The method 1300 proceeds from act 1304 to act 1306. In an embodiment, reserved bits of an encoding standard may be employed for one or more of the described variables or flags, or for one or more of the described parameters. In an embodiment, the reserved bits indicate a perceptual quality level for the object.

At act 1306, it is determined whether the object_present_flag and the object_init_flag are both set. When it is determined that the object_present_flag and the object_init_flag are both set, the method proceeds from act 1306 to act 1308. Otherwise, the method 1300 proceeds from act 1306 to act 1310.

At act 1308, an object_id and frame_num for the ROI or object are determined and encoded in the bit stream. The method 1300 proceeds from act 1308 to act 1310.

At act 1310, it is determined whether the ROI_rectangle_appearance_flag is set. When it is determined that the ROI_rectangle_appearance_flag is set, the method 1300 proceeds from act 1310 to act 1312. When it is determined at act 1310 that the ROI_rectangle_appearance_flag is not set, the method 1300 proceeds from act 1310 to act 1326.

At act 1312, it is determined whether the object_init_flag is set. When it is determined that the object_init_flag is set, the method 1300 proceeds from act 1312 to act 1314. When it is determined at act 1312 that the object_init_flag is not set, the method 1300 proceeds from act 1312 to act 1316.

At act 1314, parameters total_num_basis_image_minus1, basis_dim_x, and basis_dim_y are determined and encoded in the bit stream. The method 1300 proceeds from act 1314 to act 1316.

At act 1316, it is determined whether the object_present_flag is set. When it is determined that the object_present_flag is set, the method 1300 proceeds from act 1316 to act 1318. When it is determined at act 1316 that the object_present_flag is not set, the method 1300 proceeds from act 1316 to act 1328.

At act 1318, parameters instantaneous_number_of basis vectors, center_x_diff; center_y_diff, width_w_diff, height_h_diff and angle_theta_diff are determined and encoded in the bit stream. The method 1300 proceeds from act 1318 to act 1320.

At act 1320, it is determined whether the object_init_flag is set. When it is determined at act 1320 that the object_init_flag is set, the method 1300 proceeds from act 1320 to act 1328. When it is determined at act 1320 that the object_init_flag is not set, the method 1300 proceeds from act 1320 to act 1322.

At act 1322, the projection coefficients proj_r[i], proj_g[i], and proj_b[i] for each instantaneous basis vector are determined and encoded in the bit stream. These coefficients may be encoded as arrays. In an embodiment, a counter may be set and incremented and a loop used to facilitate determination of these coefficients. The method 1300 proceeds from act 1322 to act 1324.

At act 1324, intra-macroblock layer encoding for object residual is performed, for example, using a syntactical structure similar to that of H.264/AVC intra macroblocks. It may comprise encoding object residual data as an H.264 I slice. The method 1300 proceeds from act 1324 to act 1328.

This generic syntax facilitates the prioritization of ROIs within SVC. In higher enhancement layers by increasing the number of basis vectors and basis dimension for different objects, a better representation of a ROI and thus higher perceptual quality can be achieved. In addition, in the embodiment as illustrated support for arbitrarily-shaped objects may be provided. For example, in the illustrated embodiment, the ROI_rectangle_appearance_flag may not be set in the case of an arbitrarily-shaped object. Thus, at act 1326 other ROI encoding may occur, labeled in FIG. 13 as silhouette processing. This processing may include one or more acts similar or identical to acts 1312 to 1324, one or more different acts, such as encoding an object shape mask, etc. The method 1300 proceeds from act 1326 to act 1328.

At act 1328, other processing may occur, such as housekeeping, or determining whether further frames should be processed. For example, it may be determined at act 1328 to obtain a next frame in a sequence of image frames and return to act 1304. The method 1300 proceeds from act 1328 to act 1330, where the method 1300 stops.

Embodiments of methods for encoding a raw byte sequence payload in a bit stream may include additional acts not shown in FIG. 13, may omit acts shown in FIG. 13, and may perform the acts shown in FIG. 13 in different orders. For example, the embodiment shown in FIG. 13 may be modified to facilitate encoding for multiple objects or ROI in a frame.

FIG. 14 illustrates an embodiment of a bit stream format for extending H.264 with appearance-based ROI coding. The embodiment illustrated in FIG. 14 may be employed, for example, in the embodiments of encoders and decoders illustrated in FIGS. 3 and 11, and in the embodiment of a system of FIG. 8, and may be generated using an embodiment of the method of FIG. 13. In FIG. 14, # designates a frame number, and * designates an object number. As shown in FIG. 14, object data, ROI NAL, is multiplexed with background data BCK.

The ROI NAL encapsulates necessary information, such as where and how the object is placed in the scene, the object's appearance, and other relevant information, so that a decoder can reconstruct the video. In an embodiment, NAL unit type 26 may employed as an access unit for a video frame, as this unit type is still unspecified by the H.264 standard. This facilitates transmitting ROI related data multiplexed with legacy H.264 specific data, while handling prioritized ROI coding in H.264 by object appearance. This generic data structure as illustrated also complies with the formats of other ROI coding techniques, such as those discussed by Roth et al described earlier.

As mentioned above, an online appearance-based object tracker may be employed in embodiments of the systems, methods and articles described herein, such as those described above with respect to FIGS. 1-14. Some embodiments of appearance-based object trackers and features which may be employed in various embodiments of appearance-based object trackers are described by way of example below.

In an embodiment, an object may be defined by its minimum bounding rectangle. In an embodiment, an object tracker is configured to detect two-dimensional translation, rotation, zooming and changes in aspect ratio of an object. In an embodiment, an appearance-based tracker is configured to perform particle filtering using extended dynamic models and importance sampling. In an embodiment, an embedded particle filter employs importance sampling based on a normalized color histogram. In an embodiment, an appearance-based object tracker may be configured to factor in full or partial occlusion of an object.

There are numerous tracking algorithms proposed in the literature like mean-shift or camshift algorithms, appearance-based tracking, etc. Black and Jepson propose a subspace analysis based tracking algorithm (Eigen Tracking) with a subspace constancy assumption. See, M. J. Black and A. D. Jepson, "EigenTracking: Robust Matching and Tracking of Articulated Objects Using a View-Based Representation", International Journal of Computer Vision, vol. 26, no. 1, pp. 63-84, 1998. Black and Jepson's method employs offline training. That essentially means an absence of Eigen basis updating, which makes it inappropriate for an online system. In addition, if the tracked target undergoes significant appearance change, the tracker fails. In M. J. Black, D. J. Fleet, and Y. Yacoob, "A framework for modelling appearance change in image sequences", in *Proc. Sixth International Conference on Computer Vision*, 4-7 Jan. 1998. pp. 660-667, a mixture model is used to represent and recover appearance changes in an image sequence. In A. D. Jepson, D. J. Fleet, and T. F. El-Maraghi, "Robust online appearance models for visual tracking", *IEEE Trans. Pattern Anal. Machine Intell.*, vol. 25, no. 10, pp. 1296-1311, October 2003, wavelet-based mixture model-fitting is proposed using an online Eigen Modeling algorithm to account for appearance variation during tracking. In Z. Khan, T. Balch, and F. Dellaert, "A rao-blackwellized particle filter for eigentracking", in *Proc. IEEE Computer Society Conference on Computer Vision and Pattern Recognition CVPR* 2004, vol. 2, 27 June-2 July, pp. II-980-II-986, a Rao-Backwellization particle filter is employed for EigenTracking. In Jeffrey Ho, Kuang-Chih Lee, Ming-Hsuan Yang, David Kriegman, "Visual Tracking Using Leaned Linear Subspaces". *Proc of the 2004 IEEE Computer Society Conference on Computer Vision and Pattern Recognition CVPR* 2004, vol. 1, 27 June-2 July, pp. 1-782-1-789, a visual tracking algorithm based on linear subspace learning is employed. A uniform-norm based reconstruction error norm is used to find a linear subspace that best approximates the observations available in the previous frames, and adaptively update that subspace. In D. Skocaj and A. Leonardis, "Weighted and robust incremental method for subspace learning," in Proc. Ninth IEEE International Conference on Computer Vision, 13-16 Oct. 2003, pp. 1494-1501, an incremental and weighted method for subspace learning is presented. In D. Ross, J. Lim, and M.-H. Yang, "Adaptive probabilistic visual tracking with incremental subspace update," in *Proc. ECCV'04*, 2004, pp. 470-482, an online subspace-based-model training method is proposed that adapts the model to variations in the object appearance. In R.-S. Lin, "Adaptive discriminative generative model and its applications," in *Proc. NIPS'04*, 2004, pp. 801-808, an adaptive discriminative generative model based on subspace analysis is proposed which adapts to reflect appearance variation of the target as time progresses. J. Limy, D. Ross, R. Lin, and M. Yang, "Incremental learning for visual tracking," in *Proc. NIPS'05*, 2005, pp. 793-800, presents a complete incremental learning framework for tracking. A linear subspace is trained based on an appearance model online and updated over time. The data mean also is considered in the learning stage. The tracking algorithms discussed in this paragraph are subspace-based tracking algorithms. They all represent the target image as a vector and use the PCA method to learn the subspace model in some way or other.

On the other hand, the Isard and Blake CONDENSATION algorithm can represent simultaneous multiple hypothesis. See, M. Isard and A. Blake, "CONDENSATION—Conditional Density Propagation For Visual Tracking", *International Journal of Computer Vision*, vol. 28, no. 1, pp. 5-28, (1998). This kind of particle filter approach has the ability to track high agile motion, even against clutter, and to track in high-speed. There can be several ways by virtue of which the power of an EigenTracker and a particle filter can be combined. See, Namita Gupta, Pooja Mittal, Kaustubh S. Patwardhan, Sumantra Dutta Roy, Santanu Chaudhury and Subhashis Banerjee, "On Line Predictive Appearance-Based Tracking", in *Proc. IEEE Int'l Conf. on Image Processing (ICIP 2004)*, pp 1041-1044; Kaustubh Srikrishna Patwardhan, Sumantra Dutta Roy, "Hand gesture modelling and recognition involving changing shapes and trajectories, using a Predictive EigenTracker", *Pattern Recognition Letters*, vol. 28, no. 3, pp. 329-334, February 2007. Most of them have the overhead of non-linear optimization. Jeffrey Ho, Kuang-Chih Lee, Ming-Hsuan Yang, David Kriegman, "Visual Tracking Using Learned Linear Subspaces". *Proc of the 2004 IEEE Computer Society Conference on Computer Vision and Pattern Recognition CVPR 2004*, vol. 1, 27 June-2 July, pp. 1-782-1-789, proposes a fast appearance tracker which eliminates non-linear optimizations completely but it lacks the benefit of a predictive framework. At the same time, the uniform-norm based choice of subspace (local means) may not always be a good representation of the subspace due to the fact that the linear independence between possible non-zero vectors may not always be achieved.

In an embodiment, the capabilities of an EigenTracker are enhanced by augmenting the EigenTracker with a condensation-based predictive framework to increase the tracker's efficiency. In addition, non-linear optimization is avoided to improve speed performance. A particle filter is employed to propagate the sample distribution over time. In addition, a normalized color histogram based importance sampling is employed with the particle filter approach.

As discussed above, an embodiment of a unified-tracking-coding approach includes appearance-based tracking. Embodiments of an appearance-based tracking algorithm are described below.

The target (e.g., ROI) in each frame may be represented as a rectangular window parameterized by five elements [$x_t$, $y_t$, $w_t$, $h_t$, $\theta_t$], where ($x_t$, $y_t$) represents the position of the tracking window, ($w_t$, $h_t$) represents the width and height of the tracking window, and $\theta t$ represents the 2D rotation angle of the tracking window. These five motion parameters describe a tracked object with its bounding box being an oriented rectangle.

For modeling a target's appearance during tracking, the representation of the target uses appearance information. The observed target image O is a three dimensional color image. In an embodiment, the size of basis images, which may be defined as $I_1 \times I_2$, and a number of basis images d are the input of a tracking algorithm. That means the number d of basis images are updated since in most tracking problems, the object of interest undergoes changes in appearance over time. These d images may be vectorized to be $(I_1 * I_2) \times 1$ dimensional internally. In an embodiment, there will be a different subspace for each of the color planes, i.e. Red, Green and Blue.

It is generally not feasible to learn all possible poses and shapes even for a particular domain of application, off-line. Therefore, the relevant Eigen spaces are learned and updated on the fly. Since a naive O(mN3) algorithm (for N images having m pixels each) is time-consuming, an optimal incremental principal component analysis of O(mNk) algorithm using efficient estimation may be employed (for k most significant singular values. See J. Weng, Y. Zhang, and W. Hwang, "Candid covariance free incremental principal component analysis", IEEE Transactions on Pattern Analysis and Machine Intelligence, Vol. 25(8), pp. 1034-1040 (2003).

In reality video objects may undergo shape changes over time by having different local motions in different parts of the object. Thus, a single global motion compensation model does not provide a good estimate of the object motion. In an embodiment, the estimate is improved by modeling the appearance of the entire object. The basic assumption is that the appearance space (that includes non-rigid motion, different poses, and views of the object) of an object may be represented by a small number of principal components. Such an assumption about appearance space is used in object recognition literature, (see, Peter M. Roth and Martin Winter, "Survey of Appearance-Based Methods for Object Recognition", Technical Report ICG-TR-01/08, Graz University of Technology, Austria) and is also consistent with experimental results. In addition, it is notable that transitions between different poses and views of an object in a video are usually smooth, and thus, the appearance of an object in the kth frame of a video sequence can be generated by using the subspace of the object's appearances that were observed until frame k−1; i.e. retaining key poses as basis vectors (e1, . . . , ek) and using a linear combination (a1, . . . , ak) of basis vectors to estimate a new object pose. The object's appearance in the kth frame may be coded in terms of the coefficients of the principal components of this subspace. The rigid component of the object's motion may be estimated (tracking) by restricted affine motion [oriented rectangle] parameters. This has the potential of very high compression gain compared to MPEG2 coding, H.264 coding, etc., and the improvements have been verified experimentally.

Figure 15:
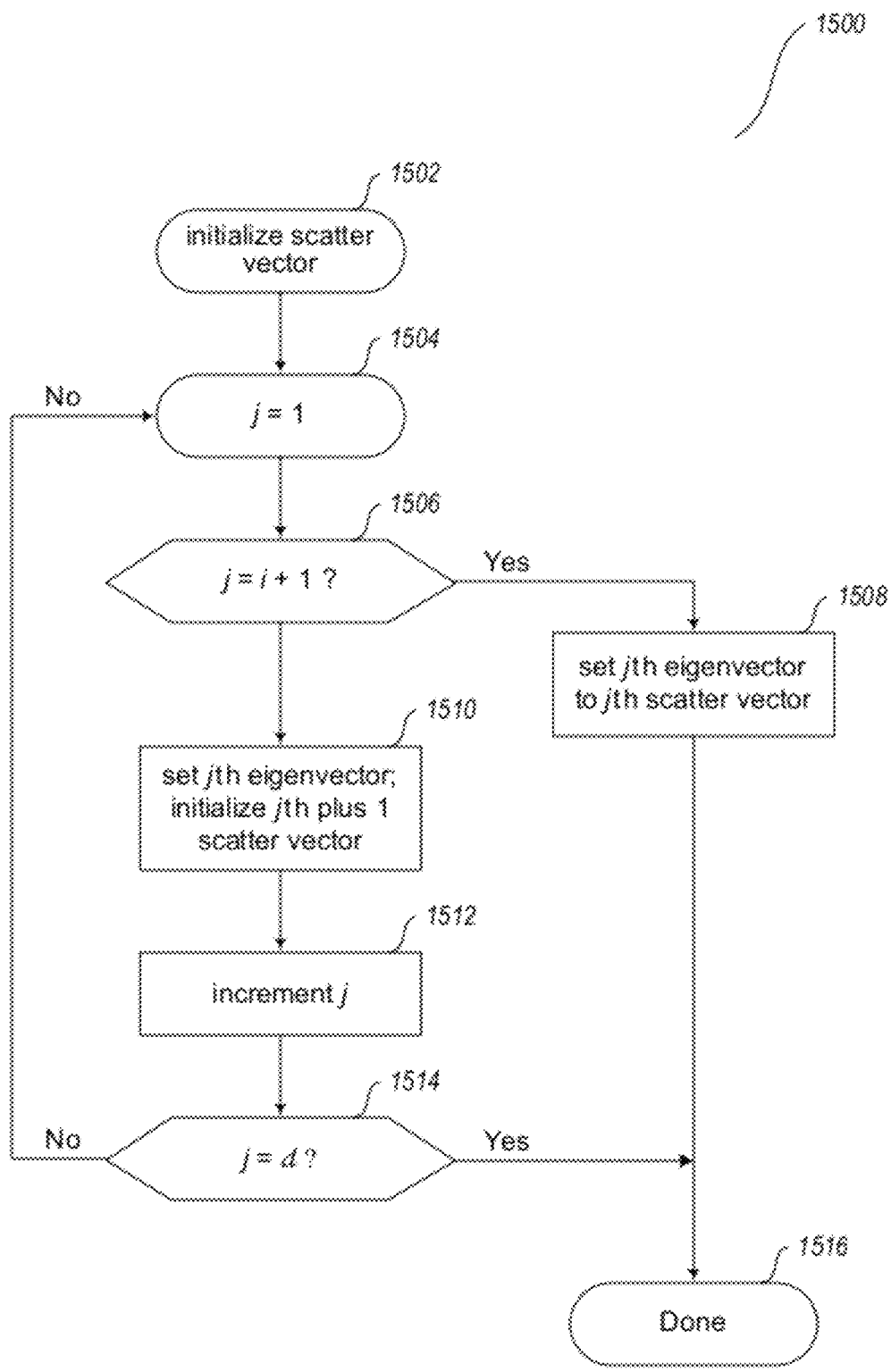
FIG. 15 illustrates an embodiment of a method of determining dominant Eigen vectors.

In an embodiment, d dominant eigenvectors $v_1(n)$, $v_2(n)$, . . . , $v_d(n)$ may be determined directly from observations. At each time frame $F_{i+1}$, an embodiment of an IPCA method iteratively computes new principal components $v_j(i+1)$ (for j=1, 2, ... d), as shown in FIG. 15. The method 1500 may be employed, for example, in the context of the embodiments discussed above with respect to FIGS. 1-14.

At act 1502, a scatter vector $u_1(i+1)$ for the current frame is initialized to the object vector for the current frame $O_{i+1}$.

At act 1504, a counter j is initialized. As illustrated, the counter j is initialized to one. At act 1506, the method 1500 determines whether the counter j is equal to i+1. When it is determined at act 1506 that the counter j is equal to i+1, the method proceeds from act 1506 to act 1508.

At act 1508, the jth eigenvector $v_j(i+1)$ is set to the scatter vector $u_j(i+1)$. The method 1500 proceeds from act 1508 to act 1516.

When it is determined at act 1506 that the counter j is not equal to i+1, the method 1500 proceeds from act 1506 to act 1510. At act 1510, the method 1500 sets the jth eigenvector as follows:

$$v_j(i+1) = \frac{t-l}{t+1} v_j(i) + \frac{1+l}{t+1} u_j(i+1) u_j^T(i+1) \frac{v_j(t)}{\|v_j(t)\|} \quad (6)$$

and initializes the jth plus 1 scatter vector as follows:

$$u_{j+1}(i+1) = u_j(i+1) - u_j^T(i+1) \frac{v_j(t+1)}{\|v_j(t+1)\|} \frac{v_j(t+1)}{\|v_j(t+1)\|} \quad (7)$$

where l is the amnesic parameter giving larger weights to newer samples, and $\|v\|$ is the eigenvalue of v. Intuitively, eigenvectors $v_j(i)$ are pulled towards the data $u_j(i+1)$, for the current eigenvector estimate $v_j(i+1)$ in equation 6. Since the eigenvectors have to be orthogonal, equation 7 shifts the data $u_{j+1}(i+1)$ normal to the estimated eigenvector $v_j(i+1)$. This data $u_{j+1}(i+1)$ is used for the estimating the (j+1)-th eigenvector $v_{j+1}(i+1)$. The IPCA method converges to the true eigenvectors in fewer computations than PCA. See Y Zhang and J Weng, "Convergence Analysis of Complementary Candid Incremental Principal Component Analysis," Technical Report MSU-CSE-01-23, Dept. of Computer Science and Eng., Michigan State University, East Lansing (August 2001). The method 1500 proceeds from 1510 to 1512. At 1512, the counter j is incremented. The method proceeds from act 1512 to act 1514, where it is determined whether the counter j is equal to the desired number d of dominant eigenvectors Since the real mean of the image data is unknown, the sample mean is incrementally estimated after the nth observation, $\overline{m(n)}$ by $$\overline{m(n)} = \frac{n-1}{n} \overline{m(n-1)} + \frac{1}{n} x(n) \quad (8)$$

Where x(n) is the nth sample image. The data entering the IPCA algorithms are the scatter vectors, $$u(n) = x(n) - \overline{m(n)} \text{ for } n=1,2,\ldots \quad (9)$$

Figure 16:
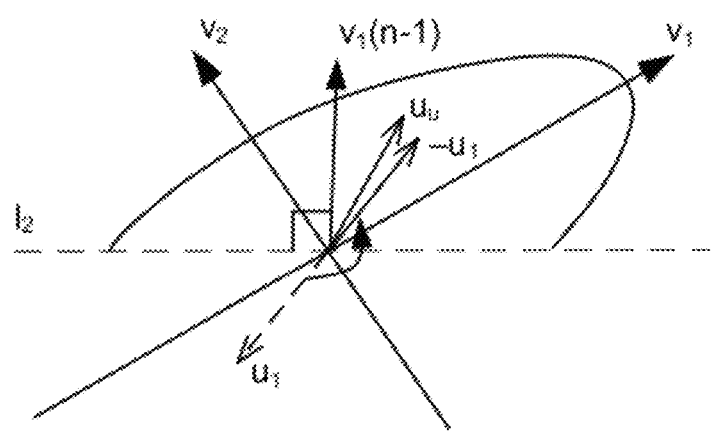
FIG. 16 illustrates a geometric interpretation of an ICPA.

FIG. 16 shows a geometric interpretation of an ICPA. Intuitively, eigenvectors $v_j(i)$ are pulled towards the data $u_j(i+1)$, for the current eigenvector estimate $v_j(i+1)$. Since the eigenvectors have to be orthogonal, data $u_{j+1}(i+1)$ is shifted normal to the estimated eigenvector $v_j(i+1)$. This data $u_{j+1}(i+1)$ is used for the estimating the (j+1)th eigenvector $v_{j+1}(i+1)$.

After this update algorithm after each frame, the columns of eigen-vectors are normalized to ensure ortho-normalization.

Appearance-based tracking employs a measure to evaluate the similarity between the candidate and the target model. A reconstruction error is employed to measure a distance between the candidate and the target model. Each oriented rectangular region taken as a candidate is first warped into the predefined size of $I_1 \times I_2$. After vectorization there are three vectors of $(I_1*I_2) \times 1$, one each for different color planes.

Given a test sample X (vectorized) reconstruction error may be defined as:

$$RE = \sum_{t=1}^{3} \left\{ X_t - \sum_{j=1}^{j=d} [V_{tj} \cdot \{V_{tj}^T \cdot (X_t - m_t)\} + m_t] \right\} \quad (10)$$

Here index 'i' refers to indices of color plane (total three), and index 'j' refers to indices of eigen-vectors (total d), $m_t$ is the mean of $i^{th}$ color plane; $V_{tj}$ is the $j^{th}$ basic vector of $i^{th}$ color plane.

The inner term is defined as projection coefficients, e.g.

$$K_{ij} = V_{ij}^T \cdot (X_i - m_i) \quad (11)$$

The tracker may avoid any kind of non-linear optimization and the candidate which is of a minimum distance from the learnt subspace is taken as the tracked object in the next frame (if the distance is less than a threshold, otherwise occlusion is inferred).

In this tracking framework, motion of a target between two consecutive frames may be approximated by a restricted affine image warping. In an embodiment, five parameters of restricted affine transform may be employed, e.g., a target is allowed to undergo translation, rotation and scaling, to model the object's state transition from $X_{t-1}$ to $X_t$. The seed point of five motion parameters as described in section is employed for sampling windows around it. The predictive framework of a particle filter facilitates generating better seed values for diverse object dynamics. A few details of particle filtering seem to be mention-worthy here.

Many object tracking techniques perform tracking within a Bayesian framework, which belongs to the class of state-space approaches that attempt to estimate the state of a system over discrete time steps, assuming that noisy measurements are available at these time steps. The state vector contains the data to describe the system. For example, when tracking a moving point (object) in two dimensions, the state vector may comprise the object position (x and y coordinates), as well as its velocity and acceleration along each coordinate (e.g., it would be a six dimensional vector). The measurement vector contains observations corrupted by noise that are related to the state vector. Its dimension is usually smaller than that of state-vector. In the previous example, the measurement vector would contain "noisy" object positions (x and y coordinates, as mentioned in the image).

To perform the estimation, a system model describes the evolution of the object state over time, that is:

$$Xk = fk(xk-1, wk-1) \quad (12)$$

and a measurement model that links the noisy measurements to the state vector:

$$Zk = hk(xk, vk) \quad (13)$$

where fk: Rnx×R nw→Rnx and hk: Rnx×Rnv→Rnz are possibly nonlinear functions; wk and vk are sequences that represent the i.i.d. (independent and identically distributed) process noise and measurement noise, respectively; nx, nw, nz and nv denote the size of state, process noise, measurement, and measurement noise vectors, respectively.

To perform object tracking in a Bayesian framework, two remarks may be taken into consideration. First, the system and measurement models are available in a probabilistic form. Second, in object tracking, an estimate of the object position is made every time a new measurement becomes available. Hence, estimation may be performed recursively. Bayesian object tracking belongs to the class of online methods, that is it produces an estimate at each time step k based on all past measurements zk up to time k. assuming that the initial pdf (probability density function) of the state vector p(x0|z0) is known (z0 is the set containing no measurements). The posterior pdf p(xk|zk) is obtained at time step k. More specifically, let p(xk|xk−1) be a system model defined by Equation 12 and the process noise wk statistics in probabilistic form and p(zk|xk) the measurement model (also known as the likelihood function) defined by Equation 13 and measurement noise vk statistics. The estimation process comprises two steps. During the first step (prediction), the posterior pdf at all time step k−1, that is p(xk−1|zk−1), is propagated forward in time, using the system model p(xk|xk−1):

$$P(x_k|z_{k-1}) = \text{integrate}(p(x_k|x_{k-1})p(x_{k-1}|z_{k-1})dx_{k-1}) \quad (14)$$

Thus, obtaining the prior pdf p(xk|zk−1) at time step k. The second step (update) modifies the propagated pdf by exploiting the latest measurement available. Thus, the desired posterior pdf, p(xk|zk), can be obtained by employing Bayes' theorem:

$$P(x_k|z_k) = (p(z_k|x_k)p(x_k|z_{k-1}))/p(z_k|z_{k-1}) \quad (15)$$

Where p(z_k|z_{k-1}) is used for normalization and is calculated as follows:

$$P(z_k|z_{k-1}) = \text{integrate}(p(z_k|x_k)p(x_k|x_{k-1})dx_k) \quad (16)$$

The optimum solution in the Bayesian sense may be obtained based on Equations 14 and 15. Analytical forms of the solution may be obtained when certain assumptions hold. For example, a Kalman filter is a special case of a Bayesian filter and is a good estimator when the posterior pdf is Gaussian and the following conditions hold:

1. Functions f and h in Equations 12 and 13 are linear and known; and
2. The distribution of the process and measurement noises are Gaussian.

When the posterior pdf is not Gaussian, Kalman filters will generally not perform adequately. In such a case, a particle filter (PF) may be used. They are sequential Monte Carlo methods that can be used for object tracking with a Bayesian framework. They come in a variety of names, such as Conditional Density Propagation (or the Condensation algorithm), survival of the fittest, interacting particle approximations and so forth and have been used in tracking objects. The concept behind particle filtering is to represent the probability distribution of alternative solutions as a set of samples (particles), each of which carries a weight. Estimates of the posterior distribution are calculated based on these samples and their associated weights. As the number of samples grows, the filter approaches the optimal Bayesian estimate. The detail scenario would involve sampling directly from the posterior distribution. However, this is hardly the case. Solutions to this would be to use sampling techniques, such as factored sampling or importance sampling. If it is not feasible to sample from directly from the posterior pdf, for example because it is too complex, but it is feasible to sample directly from the prior pdf, a random sample may be assigned a weight, and the weighted set may be used as an approximation of the posterior density. To improve the results of random sampling, alternative sampling techniques may be employed. For example, importance may not sample from the prior pdf, but from another density function that can "drive" the selection of samples toward areas of the posterior pdf that may contain the most information. By doing so, the resulting set may describe the posterior pdf more efficiently. Other sampling methods may be employed.

An advantage of a particle filter approach is that principled fusion of information from different information sources may be employed. An embodiment combines a PF with appearance-adaptive models. The particle filter used in an embodiment of a tracking framework is described below.

The tracking process is governed by a dynamic model $p(X_t|X_{t-1})$ between two consecutive states $X_{t-1}$ and $X_t$, and the observation model $p(O_t|X_t)$ which denote the likelihood of $X_t$ generation observation $O_t$. A particle filter (see M. Isard and A. Blake, "CONDENSATION—Conditional Density Propagation for Visual Tracking," Int'l J. of Computer Vision, Vol. 28, No. 1 pp. 5-28 (1998); Doucet and Gordon, "Sequential Monte Carlo Methods in Practice," Springer-Verlag, N.Y. (2001)) is adopted here to approximate the distribution of target's state with a set of weighted samples.

In the particle filter, the posterior $p(X_t|O_{1:t})$ is approximated by a finite set of N samples $\{X_t^i, i=1, \ldots, N\}$ with importance weights $\{w_t^i, i=1, \ldots, N\}$. The candidate samples $\overline{X}_t^i$ are drawn from an importance distribution $q(X_t|X_{1:t-1}, O_{1:t})$ and the weights of samples are:

$$w_t^i = w_{t-1}^i \frac{p(O_t|X_t^i)p(\lambda_t^i|\lambda_{t-1}^i)}{q(X_t|X_{1:t-1}, O_{1:t})} \quad (17)$$

The samples are re-sampled to generate an un-weighted particle set according to their importance weights to avoid degeneracy. Here, $q(X_t|X_{1:t-1}, O_{1:t}) = p(X_t|X_{t-1})$ and the weights become the observation likelihood $p(O_t|X_t)$.

In the dynamic model, two different simple AR processes are used to represent the state (X) dynamics (where t represents time) described by equation 17. One is first-order AR process and another is second-order AR process. The state-space of the tracker is defined over vectors of the form as shown in Equations 18 and 19 for first-order AR (five dimensional state vector) and second-order AR (10 dimensional state-vector) respectively.

$$x = [x, y, w, h, \theta] \quad (18)$$

$$x = [x, y, w, h, \theta, \dot{x}, \dot{y}, \dot{w}, \dot{h}, \dot{\theta}] \quad (19)$$

The state vectors in first order AR process have only static components. Whereas the state vectors in the second-order AR process are naturally split into two components. The static part, $s = [x, y, w, h, \theta]$, specifies the position, size and orientation of the tracked object. The dynamic component, $d=[\dot{x},\dot{y},\dot{w},\dot{h},\dot{\theta}]$ specifies the velocities of the static elements in s. The system update equation is as follows:

$$X_t = A_t X_{t-1} + w_t \quad (20)$$

Here 'wt' is a zero-mean, white, Gaussian random vector. The measurement is the set of five parameters (s) obtained from the image, $Z_t$. The observation model has Gaussian peaks around each observation, and constant density otherwise. Each of the five motion parameters, i.e. 2D translation, rotation and 2D scaling, is modeled independently with a Gaussian distribution around its counterpart in $X_{t-1}$. $p(X_t|X_{t-1})$ is formulated as:

$$p(X_t|X_{t-1}) = N(X_t; X_{t-1}, \Sigma) \quad (21)$$

Where $\Sigma$ is a diagonal covariance matrix whose elements are corresponding variances of restricted affine parameters, i.e. $\sigma_x^2, \sigma_y^2, \sigma_w^2, \sigma_h^2, \sigma_\theta^2$.

The observation model used in this tracking framework is to measure the likelihood of $X_t$ generating observation $O_t$. The reconstruction error described in Eq. 10 is utilized to make the likelihood function measuring the similarity between sample to the real appearance of the target:

$$p(O_c|X_c) = \exp(-RE) \quad (22)$$

Here RE is the reconstruction error of the test sample with respect to the learnt subspace model. In the tracking framework, the observation function $p(O_t|X_t)$ is closely associated with the target's appearance model. In effect, when the target's appearance model is adaptively updated, the observation model is also simultaneously updated.

The values of the five motion parameters are estimated based on their predicted values and the measurements done. These estimated values serve as seeds to the next frame. For every frame, a sampled version of conditional state density $(S_t)$, and corresponding weights $(\Pi_t)$ for conditional probability propagation or CONDENSATION are obtained. The state estimate is used to generate the predictions for the next frame. The prediction framework used is based on a predictive Eigen tracker. See Gupta et al., "On Line Predictive Appearance-Based Tracking," Proc. IEEE Conf. on Image Processing, ICIP pp. 1041-44 (2004).

In the example embodiment, the normalized color distribution of the initial object description is treated with the highest priority, and is referred to herein as an initial normalized color histogram. Instead of taking normal histogram, the normalized histogram is taken to cope with the illumination changes. After estimating the target state of the object, the normalized color histogram of the associated region is compared with the initial normalized color histogram. The similarity between these two histograms is computed as the inverse of the Bhattacharya distance of the two histograms, e.g., similarity=1−Bhattacharya distance. If the similarity is greater than a predefined threshold, called upper-limit-matching, the estimated state is taken as the tracked object. If the similarity is less than upper-limit-matching, samples are taken from the updated distribution. This process is repeated until a predefined number of iterations. If after the predefined number of iterations, similarity in histogram is less than lower-limit-matching, the tracker stops tracking and does not draw a target region in the current frame. For example, it may be treated as if no match was found, which may be the case if occlusion has occurred. Otherwise the state producing the least reconstruction error with respect to the learnt subspace is taken as the estimated state.

The example tracker detects occlusion, when both the following conditions are true:

(a) Similarity between the normalized color histogram of the region associated with final estimated state and initial normalized color histogram is less than the threshold called lower-limit-matching as described above.

(b) If the reconstruction error of the region associated with final estimated state with respect to the learnt subspace is greater than a dynamic threshold, based on range of intensity values of the initial object description.

If the occlusion is detected, the subspace is not updated at that frame, but the object dynamic model will be updated. The target region is not drawn in the current frame if occlusion is detected. In subsequent frames, if both the conditions are found to be false, then the tracker determines that the object has become visible.

Figure 17:
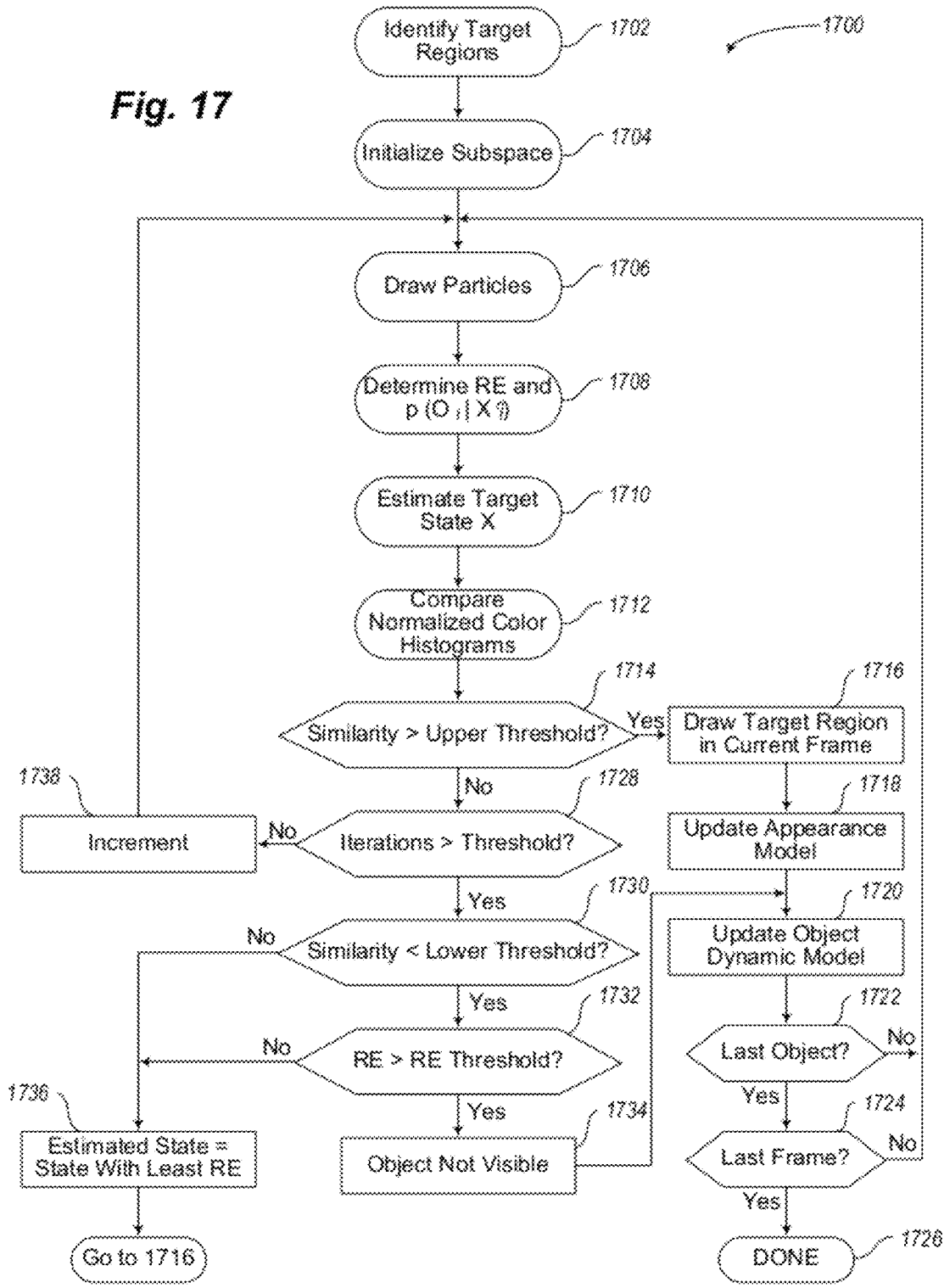
FIG. 17 illustrates an embodiment of a method of tracking an object in a sequence of video frames.
Figure 18:
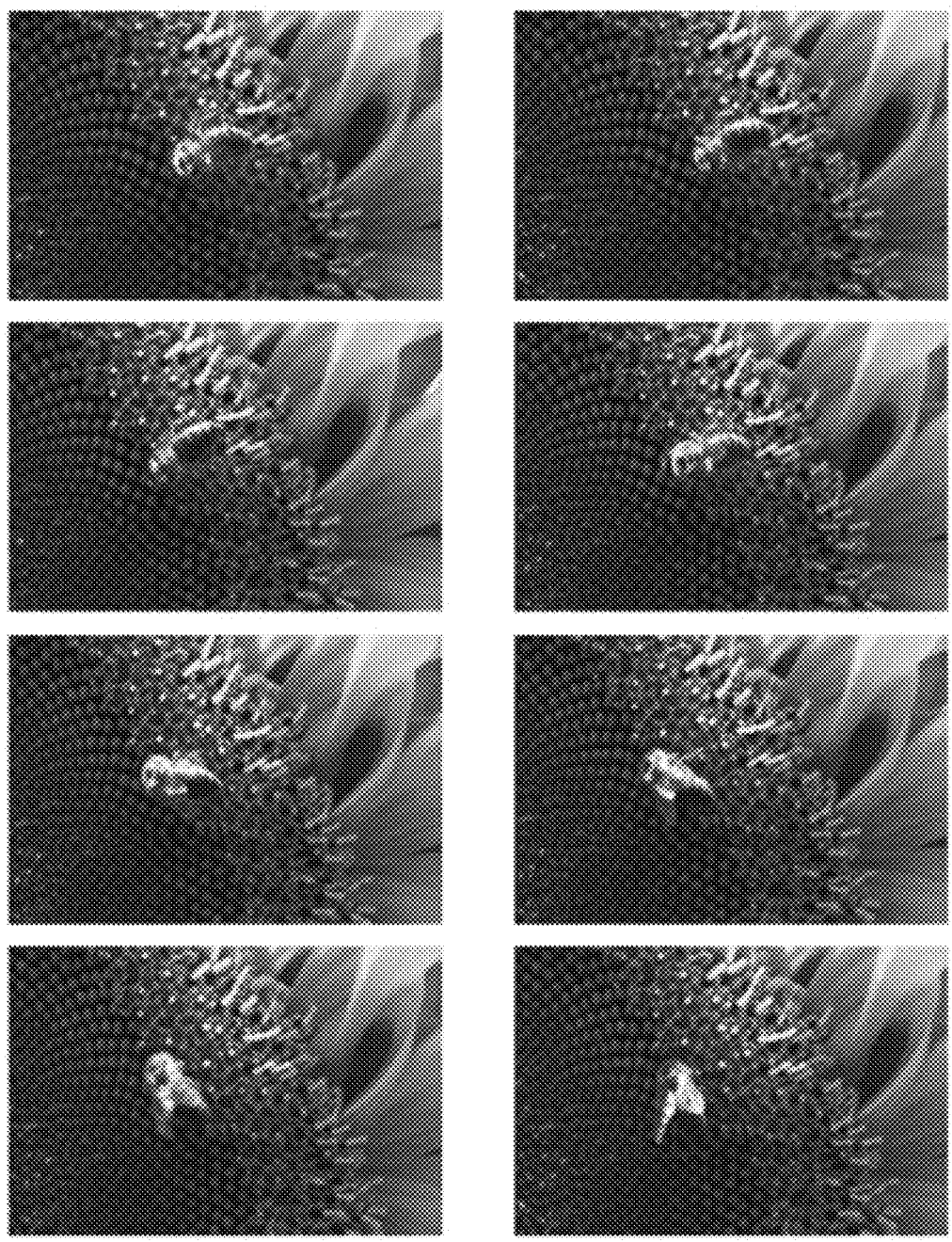
FIGS. 18-31C show example frames from image sequences tracked using an embodiment of a method of tracking one or more objects in a sequence of video frames.
Figure 19:
Figure 19:
Figure 19:
Figure 19:
Figure 20:
Figure 21:
Figure 22:
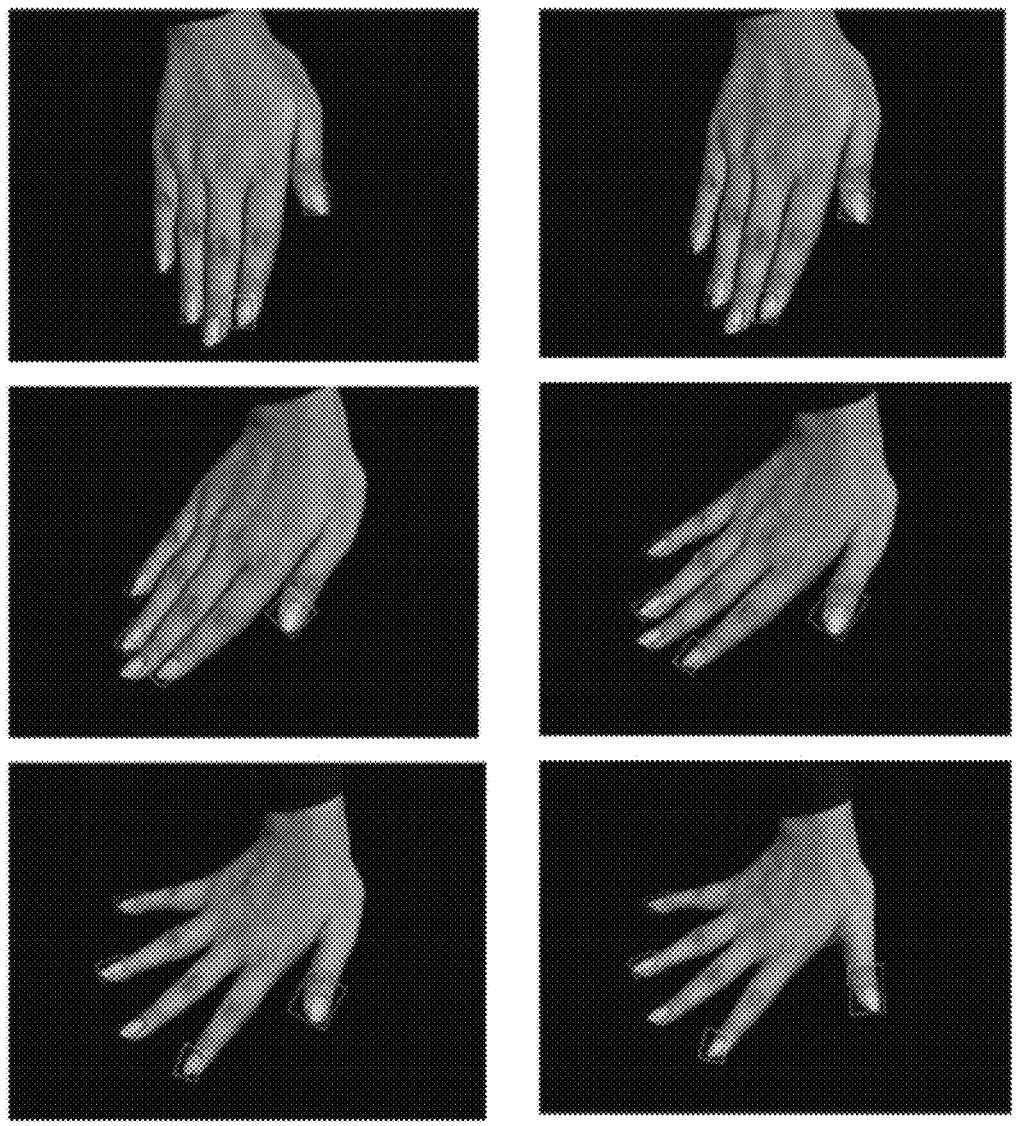
Figure 23:
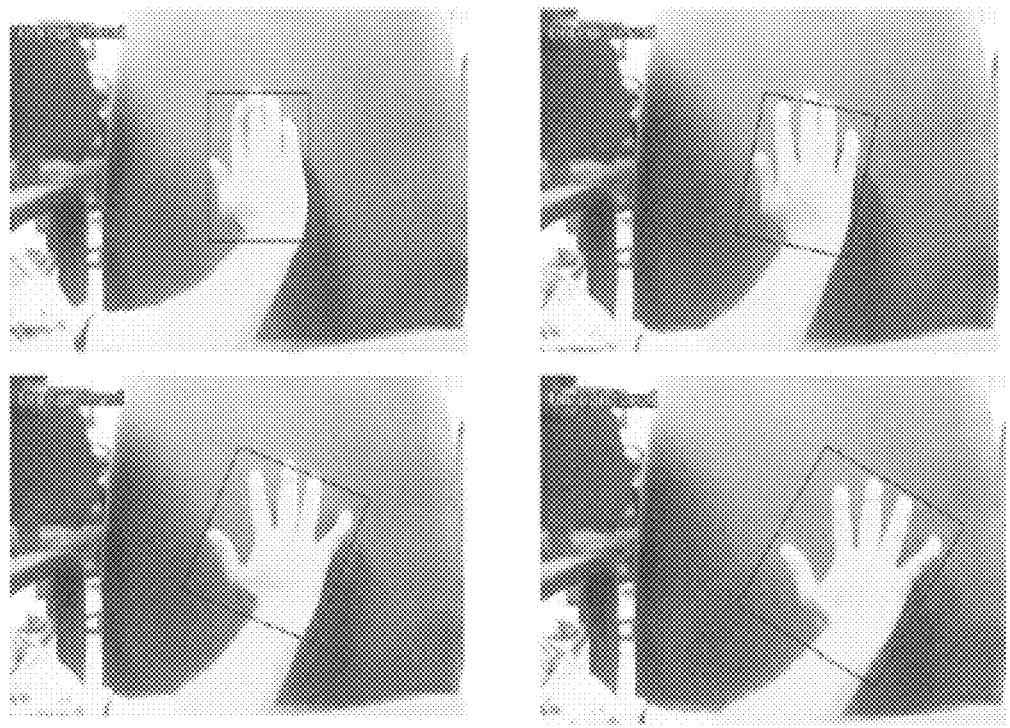
Figure 24:
Figure 25:
Figure 26:
Figure 27:
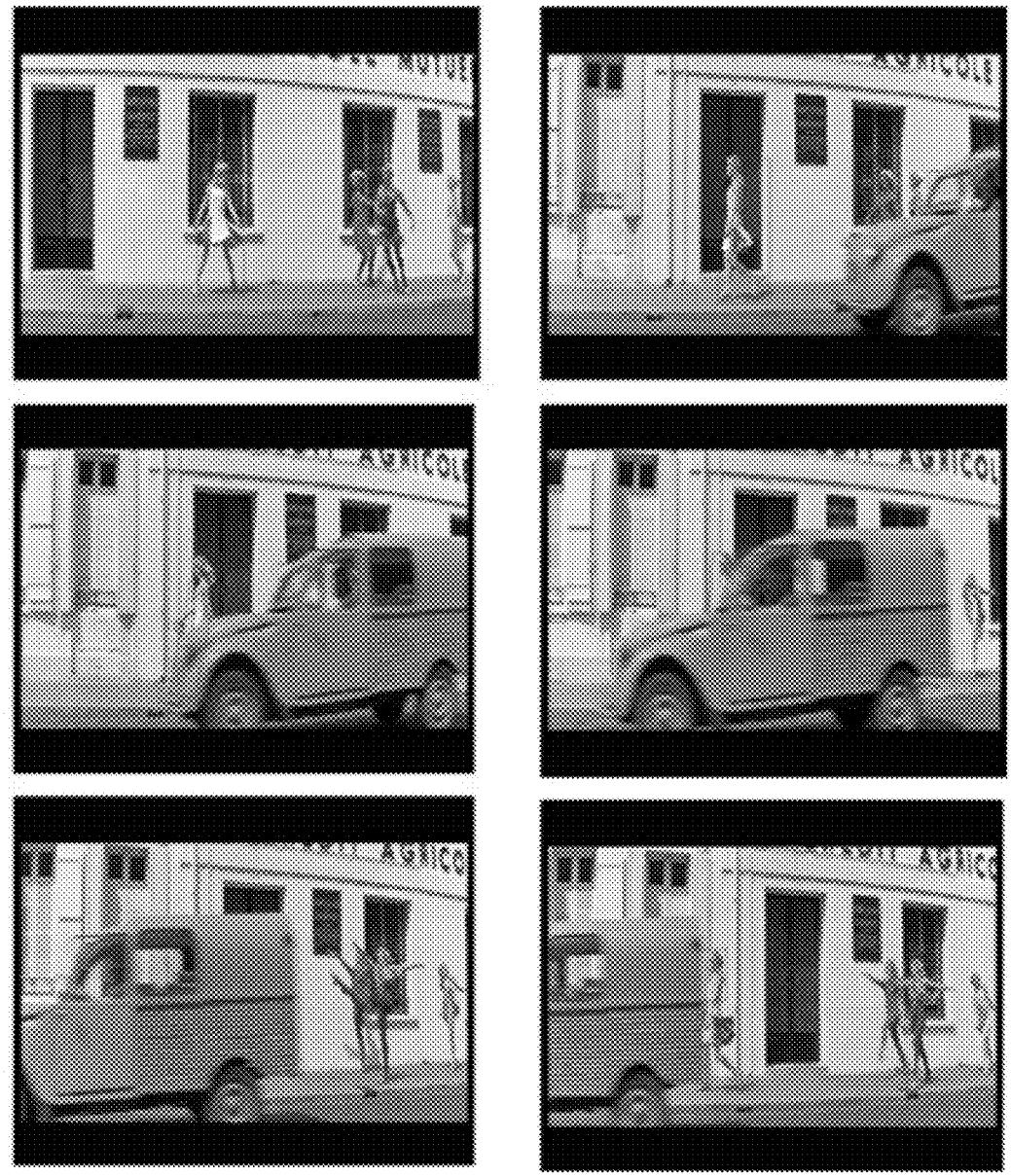
Figure 28:
Figure 29:
Figure 30A:
Figure 30B:
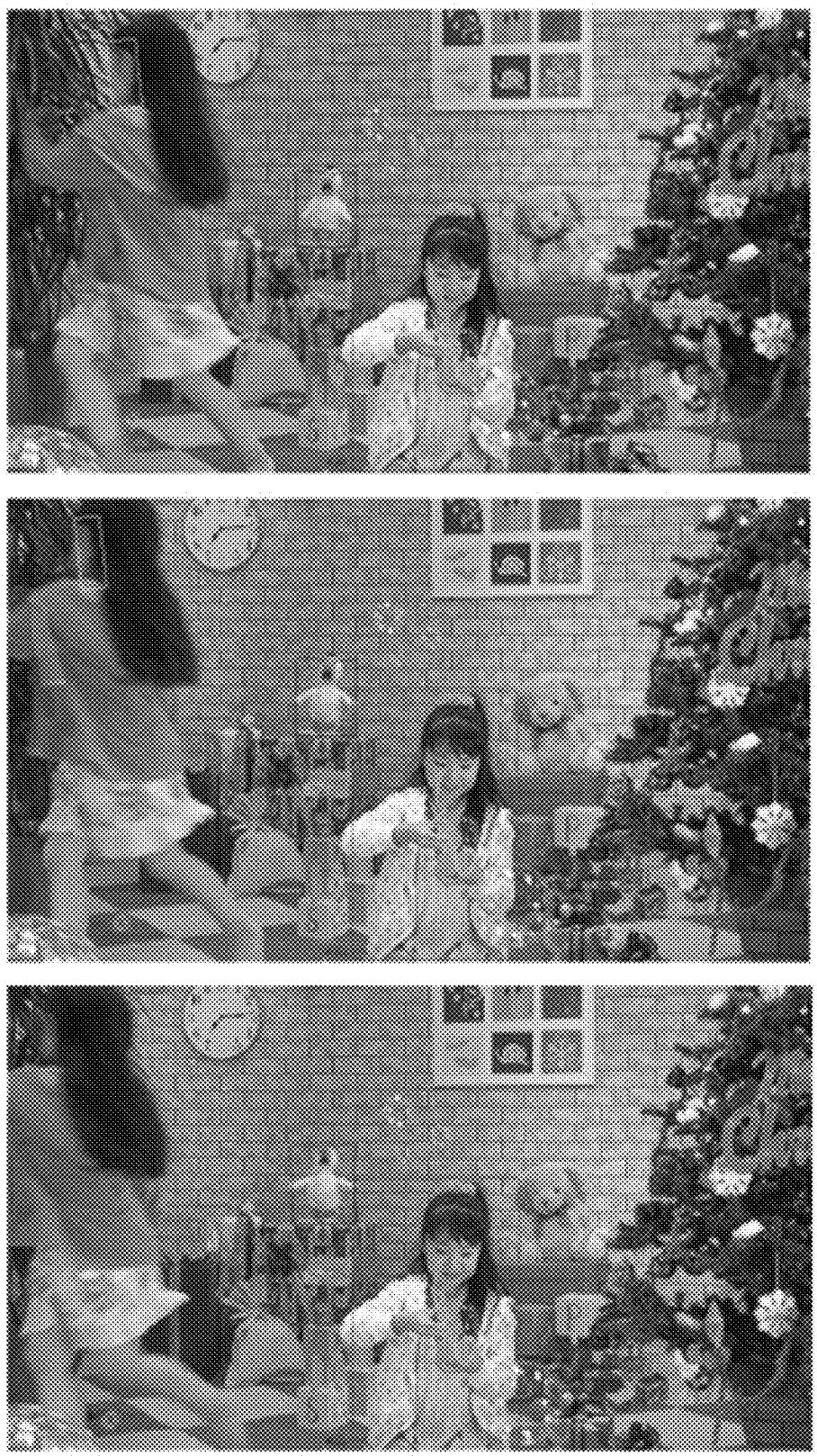
Figure 30C:
Figure 31A:
Figure 31B:
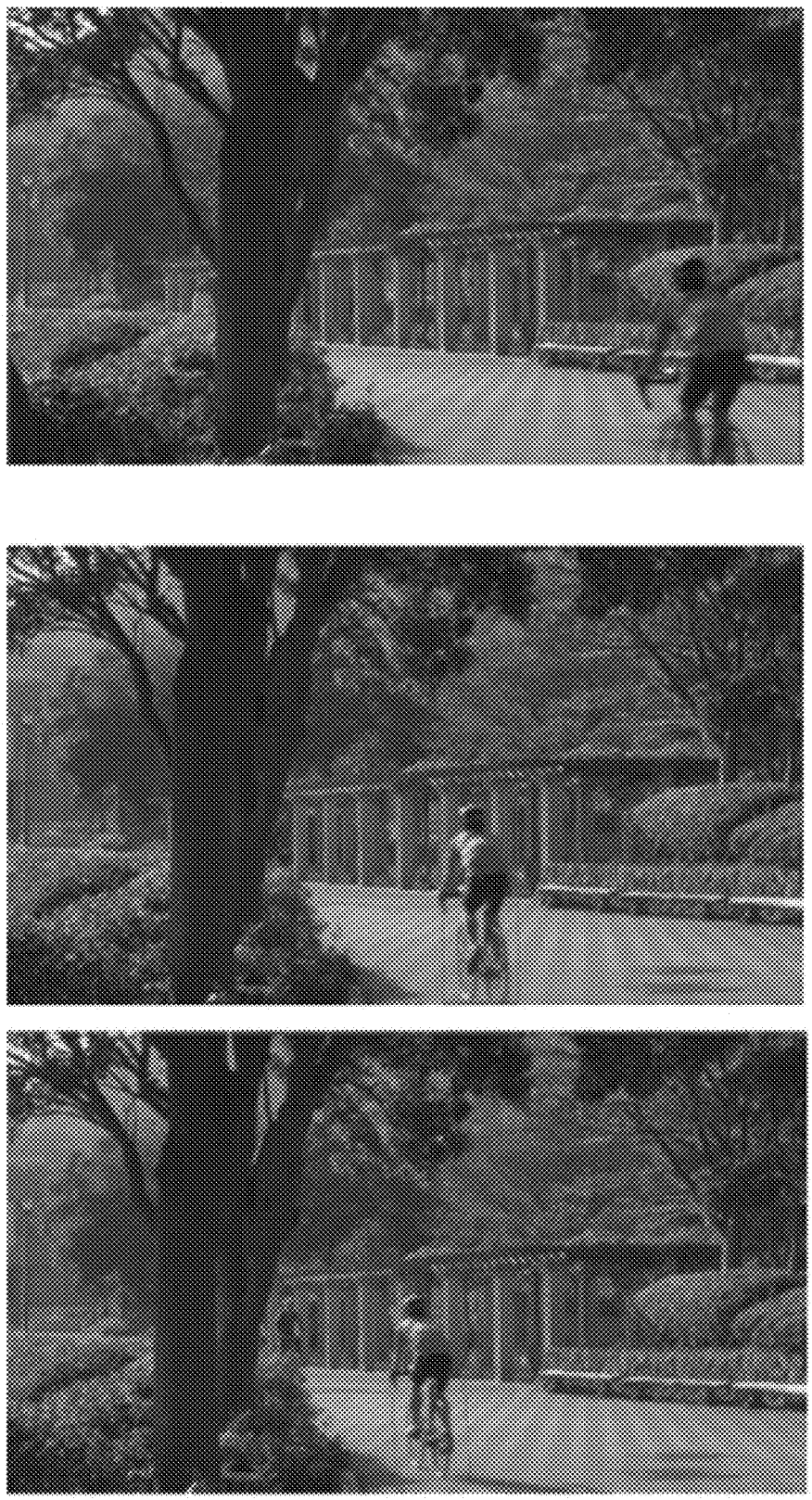
Figure 31C:

FIG. 17 illustrates an embodiment of a method 1700 of tracking an object in a sequence of received video frames. Embodiments of the method 1700 illustrated in FIG. 17, and the tracking information generated by the method 1700 (target states and regions associated with the target states), may be employed, for example, in the embodiments of encoders and decoders illustrated in FIGS. 3 and 11, and in the embodiment of a system of FIG. 8. At act 1702, one or more target regions of interest are identified. This may be done, for example, manually or using an initialization algorithm, such as by analyzing the first three frames as discussed elsewhere herein. The method 1700 proceeds from act 1702 to act 1704.

At act 1704, the subspace is initialized for each region of interest for the first time. For example, counters are initialized and an initial normalized color histogram is determined for each region of interest. The method 1700 proceeds from act 1704 to act 1706.

At act 1706, samples are selected using a dynamic model $p(X_t|X_{t-1})$ of a particle filter. In some embodiments, the five parameters of the region of interest in the last frame are automatically selected as a sample to address the situation in which no movement occurred. In some embodiments, some samples are selected based on a five parameter Gaussian model to address sudden movements, such as from a camera jerk, instead of being drawn from the distribution of the particle filter. The method proceeds from act 1706 to act 1708.

At act 1708, the reconstruction error and the likelihood $p(O_t|X_t^n)$ are determined for each sample. The method 1700 proceeds from act 1708 to act 1710. At act 1710, the target state X is estimated. This may be done by choosing a state that is a minimum distance from the learnt subspace, or a state which has a minimum reconstruction error with respect to the learnt subspace as the estimated state. The method 1700 proceeds from act 1710 to act 1712.

At act 1712, a normalized color histogram for a region associated with the estimated state is compared to the initial color histogram for the region of interest. The method 1700 proceeds from act 1712 to act 1714. At act 1714, the method 1700 determines whether the similarity between the normalized color histogram for the region associated with the estimated state and the initial normalized color histogram exceeds an upper similarity threshold. When it is determined that the similarity exceeds the upper similarity threshold, the method 1700 proceeds from act 1714 to act 1716. When it is determined that the similarity does not exceed the upper similarity threshold, the method proceeds from act 1714 to act 1728.

At act 1716, the estimated state is set as the target state for region of interest for the current frame and the target region associated with the estimated state is drawn in the current frame. The method 1700 proceeds from act 1716 to act 1718.

At act 1718, the appearance model for the region of interest is updated. The method 1700 proceeds from act 1718 to act 1720. At act 1720, the dynamic model for the region of interest is updated. The method 1700 proceeds from act 1720 to act 1722.

At act 1722, it is determined whether any additional objects (regions of interest) remain to be tracked. When it is determined that one or more additional objects remain to be tracked, the next object is selected and the method 1700 proceeds to act 1706. When it is determined that no additional objects remain to be tracked, the method 1700 proceeds to act 1724.

At act 1724, it is determined whether there are additional frames in the sequence of received frames. When it is determined that one or more additional frames remain, the next frame is selected and the method 1700 proceeds to act 1706. When it is determined that no additional frames remain, the method 1700 proceeds to act 1726.

At act 1728, the method 1700 determines whether a number of iterations of estimating a target state for the current region of interest in the current frame exceeds an iteration threshold. When the iteration threshold has not been exceeded, the method 1700 proceeds from act 1728 to act 1738, where an iteration counter is incremented. The method proceeds from act 1738 to act 1706. When the iteration threshold has been exceeded, the method 1700 proceeds from act 1728 to act 1730.

At act 1730, the method 1700 determines whether the similarity between the normalized color histogram for the region associated with the estimated state and the initial normalized color histogram is less than a lower similarity threshold. When it is determined that the similarity is less than the lower similarity threshold, the method 1700 proceeds from act 1730 to act 1732. When it is determined that the similarity is not less than the lower similarity threshold, the method proceeds from act 1730 to act 1736.

At act 1732, the method 1700 determines whether the reconstruction error for the estimated state is greater than a reconstruction error threshold. When it is determined that the reconstruction error for the estimated state is greater than the reconstruction error threshold, the method 1700 proceeds from act 1732 to act 1734. At act 1734, the method determines that the object is not visible in the current frame. The method 1700 proceeds from act 1734 to act 1720. When it is not determined that the reconstruction error for the estimated state is greater than the reconstruction error threshold, the method 1700 proceeds from act 1732 to act 1736. At act 1736, the method 1700 determines that the estimated state is the state with the least reconstruction error. The method 1700 proceeds from act 1736 to act 1716.

Embodiments of methods for tracking an object in a sequence of video frames may include additional acts not shown in FIG. 17, may omit acts shown in FIG. 17, and may perform the acts shown in FIG. 17 in different orders. For example, acts 1732 and act 1734 may be performed in different orders in an embodiment. Embodiments of methods of object tracking may be employed in real-time embedded systems for appearance-based object tracking. Embodiments may be used in various applications like object recognition, surveillance, and object-based video compression.

FIGS. 18-34 show example frames from example image sequences that can be well handled by an embodiment of the encoding scheme discussed herein.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

For instance, the foregoing detailed description has set forth various embodiments of the devices and/or processes via the use of block diagrams and examples. Insofar as such block diagrams and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). In one embodiment, the present subject matter may be implemented via one or more digital signal processors. However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape. Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A digital video encoder, comprising:
   a segmentation module configured to segment frames in a digital video sequence into background regions and object regions; and
   an object parameter generator configured to generate object motion and object appearance parameters based on segmented object regions, the object parameter generator including a tracking module configured to track object motion and changes in object appearance of segmented object regions, the tracking object motion including:
   identifying object motion parameter states based on particle filtering; and
   tracking one or more object regions based on one or more object motion parameter states selected from the identified object motion parameter states,
   wherein the tracking module is configured to:
   estimate a target state by selecting one of the identified motion parameter states;
   determine a similarity of a normalized color histogram for a region associated with the estimated target state and an initial color histogram for a region associated with an object;
   compare the similarity to a first similarity threshold;
   when the similarity exceeds the first similarity threshold, set a target state for the region associated with the object to the estimated target state;
   when the similarity does not exceed the first similarity threshold, selectively, identify new motion parameter states; and
   estimate a new target state by selecting one of the identified new motion parameter states; and
   when the similarity does not exceed the first similarity threshold and a number of iterations of identifying new motion parameter states exceeds an iteration threshold:
   determine whether the object is visible based on a comparison of the similarity to a second similarity threshold and a comparison of a reconstruction error associated with the estimated target state to a reconstruction error threshold; and
   when it is determined that the object is visible, setting the target state for the region associated with the object to an identified state having a lowest reconstruction error.

2. The digital video encoder of claim 1 wherein the object regions comprise oriented rectangles and at least one of the object motion parameters defines an orientation of an object region.

3. The digital video encoder of claim 1 wherein the particle filtering includes importance sampling.

4. The digital video encoder of claim 3 wherein the importance sampling is based on a normalized color histogram.

5. The digital encoder of claim 1 wherein the tracking module is configured to select a motion parameter state from the identified motion parameter states that is a minimum distance from a learnt subspace.

6. The digital encoder of claim 1 wherein the tracking module is configured to select a motion parameter state having a minimum reconstruction error with respect to a learnt subspace.

7. The digital video encoder of claim 1 wherein the tracking module is configured to determine whether an object is occluded in a frame.

8. The encoder of claim 1, further comprising:
   an auto regressive model generator configured to generate an auto regressive background model based on segmented background regions.

9. A method, comprising:
   segmenting frames in a digital video sequence into background regions and object regions;
   generating object motion parameters of a plurality of segmented object regions based on particle filtering;
   generating object appearance parameters of the plurality of segmented object regions, the generating object appearance parameters including tracking changes in appearance of one or more of the plurality of segmented object regions; and
   encoding the object motion parameters and the object appearance parameters in a bit stream,
   wherein the generating object motion parameters comprises selecting one of the identified motion parameter states as an estimated target state,
   and the method comprises:
   determining a similarity of a normalized color histogram for a region associated with the estimated target state and an initial color histogram for the segmented object region;
   comparing the similarity to a first similarity threshold;
   when the similarity exceeds the first similarity threshold, setting a target state for the region associated with the object to the estimated target state; and
   when the similarity does not exceed the first similarity threshold, selectively, identifying new motion parameter states; and
   estimating a new target state by selecting one of the identified new motion parameter states; and
   when the similarity does not exceed the first similarity threshold and a number of iterations of identifying new motion parameter states exceeds an iteration threshold, the method comprises:
   determining whether the object is visible based on a comparison of the similarity to a second similarity threshold and a comparison of a reconstruction error associated with the estimated target state to a reconstruction error threshold; and
   when it is determined that the object is visible, setting the target state for the region associated with the object to an identified state having a lowest reconstruction error.

10. The method of claim 9 wherein the generating object motion parameters comprises: identifying motion parameter states based on the particle filtering; and tracking the segmented object regions based on one or more motion parameter states selected from the identified motion parameter states.

11. The method of claim 9 wherein the object regions comprise oriented rectangles and the object motion parameters comprise a translation parameter, a scaling parameter and a parameter indicating a difference of an orientation angle between a width axis of the object region and an axis of a bounding box for successive frames in the digital video sequence.

12. The method of claim 9 wherein the particle filtering includes importance sampling.

13. The method of claim 12 wherein the importance sampling is based on a normalized color histogram.

14. The method of claim 9 wherein the estimated target state is one of the identified sample motion parameter states that is a minimum distance from a learnt subspace.

15. The method of claim 9 wherein the selecting one of the motion parameter states comprises determining a reconstruction error.

16. A non-transitory computer-readable medium whose contents cause an encoder to perform a method of encoding a video image sequence, the method comprising:
    segmenting frames in a digital video sequence into background regions and object regions;
    generating object motion parameters of a plurality of segmented object regions based on particle filtering;
    generating object appearance parameters of the plurality of segmented object regions, the generating object appearance parameters including tracking changes in appearance of one or more of the plurality of segmented object regions; and
    encoding the object motion parameters and the object appearance parameters in a bit stream,
    wherein the generating object motion parameters comprises selecting one of the identified motion parameter states as an estimated target state, and the method comprises:
    determining a similarity of a normalized color histogram for a region associated with the estimated target state and an initial color histogram for the segmented object region;
    comparing the similarity to a first similarity threshold;
    when the similarity exceeds the first similarity threshold, setting a target state for the region associated with the object to the estimated target state; and
    when the similarity does not exceed the first similarity threshold, selectively,
    identifying new motion parameter states; and
    estimating a new target state by selecting one of the identified new motion parameter states; and
    when the similarity does not exceed the first similarity threshold and a number of iterations of identifying new motion parameter states exceeds an iteration threshold, the method comprises:
    determining whether the object is visible based on a comparison of the similarity to a second similarity threshold and a comparison of a reconstruction error associated with the estimated target state to a reconstruction error threshold; and
    when it is determined that the object is visible, setting the target state for the region associated with the object to an identified state having a lowest reconstruction error.

17. The non-transitory computer-readable medium of claim 16 wherein the generating object motion parameters comprises:
    identifying motion parameter states based on the particle filtering; and
    tracking the segmented object regions based on one or more motion parameter states selected from the identified motion parameter states.

18. The non-transitory computer-readable medium of claim 16 wherein the object regions comprise oriented rectangles and the object motion parameters comprise a translation parameter, a scaling parameter and a parameter indicating a difference of an orientation angle between a width axis of the object region and an axis of a bounding box for successive frames in the digital video sequence.

19. The non-transitory computer-readable medium of claim 16 wherein the particle filtering includes importance sampling.

* * * * *